(12) United States Patent
Huda et al.

(10) Patent No.: US 12,042,109 B2
(45) Date of Patent: Jul. 23, 2024

(54) FLAT HEADED MOP AND METHOD OF OPERATION

(71) Applicant: Unger Marketing International, LLC, Bridgeport, CT (US)

(72) Inventors: Stephen P. Huda, Shelton, CT (US); Joseph K. Patterson, Monroe, CT (US); Robert F. Smith, Waterbury, CT (US); William Harrington, Newtown, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

(21) Appl. No.: 17/984,792

(22) Filed: Nov. 10, 2022

(65) Prior Publication Data

US 2023/0077150 A1   Mar. 9, 2023

Related U.S. Application Data

(62) Division of application No. 16/423,804, filed on May 28, 2019, now Pat. No. 11,576,550.

(Continued)

(51) Int. Cl.
A47L 13/256  (2006.01)
A46B 5/00  (2006.01)
(Continued)

(52) U.S. Cl.
CPC .......... *A47L 13/256* (2013.01); *A46B 5/0041* (2013.01); *A46B 5/0045* (2013.01);
(Continued)

(58) Field of Classification Search
CPC ...... A47L 13/20; A47L 13/253; A47L 13/254; A47L 13/256; A47L 13/258; A47L 13/58;
(Continued)

(56) References Cited

U.S. PATENT DOCUMENTS 355,522 A   1/1887   Harris
395,960 A   1/1889   Drew
(Continued)

FOREIGN PATENT DOCUMENTS

AU   2014215927 A1   9/2014
BE      1009731 A6   7/1997
(Continued)

OTHER PUBLICATIONS

European Office Action for Application No. 19810953.0, dated Jun. 14, 2022, 8 pages.

(Continued)

*Primary Examiner* — Randall E Chin
(74) *Attorney, Agent, or Firm* — McCarter & English, LLP; Dave S. Christensen

(57) ABSTRACT

A method of using a flat headed mop is provided. The method includes cleaning a surface with the mop pad, then rotating the mop head into the folded position at a instance with a biasing member coupled to a hinge assembly. The hinge assembly being disposed between the mop head and a mop pole. Next, inserting the mop head into a first fluid to remove contaminants from the mop pad, then inserting the mop head into a wringing assembly to remove at least a portion of the first fluid.

20 Claims, 35 Drawing Sheets

Related U.S. Application Data

(60) Provisional application No. 62/833,255, filed on Apr. 12, 2019, provisional application No. 62/795,239, filed on Jan. 22, 2019, provisional application No. 62/767,579, filed on Nov. 15, 2018, provisional application No. 62/695,486, filed on Jul. 9, 2018, provisional application No. 62/677,376, filed on May 29, 2018.

(51) Int. Cl.
*A47L 11/40* (2006.01)
*A47L 13/20* (2006.01)
*A47L 13/258* (2006.01)
*A47L 13/51* (2006.01)
*A47L 13/58* (2006.01)
*A47L 13/60* (2006.01)
*B62B 3/10* (2006.01)
*B65F 1/14* (2006.01)
*F16C 11/04* (2006.01)

(52) U.S. Cl.
CPC .......... *A46B 5/0058* (2013.01); *A46B 5/0083* (2013.01); *A47L 11/4083* (2013.01); *A47L 13/20* (2013.01); *A47L 13/258* (2013.01); *A47L 13/51* (2013.01); *A47L 13/58* (2013.01); *A47L 13/60* (2013.01); *B62B 3/106* (2013.01); *B65F 1/141* (2013.01); *F16C 11/045* (2013.01); *B62B 2207/02* (2013.01)

(58) Field of Classification Search
CPC ... A46B 5/0041; A46B 5/0045; A46B 5/0058; A46B 5/0083
See application file for complete search history.

(56) References Cited

U.S. PATENT DOCUMENTS

| | | |
|---|---|---|
| 493,340 A | 3/1893 | Prescott |
| 1,517,187 A | 11/1924 | Bonsall |
| 1,673,473 A | 6/1928 | Sands |
| 2,286,944 A | 6/1942 | Altland |
| 2,671,239 A | 3/1954 | Wisner |
| 2,740,146 A | 4/1956 | Vaughn |
| 2,796,617 A | 6/1957 | Remington |
| 2,852,794 A | 9/1958 | Blum |
| 2,966,689 A | 1/1961 | Antonucci, Jr. |
| 3,280,418 A | 10/1966 | Schonberger |
| 3,341,876 A | 9/1967 | Campbell |
| D212,831 S | 11/1968 | Koch |
| 3,593,359 A | 7/1971 | Strauss |
| D236,075 S | 7/1975 | Golden |
| D250,245 S | 11/1978 | Bebb |
| 4,161,799 A | 7/1979 | Sorrells |
| 4,704,763 A | 11/1987 | Sacks et al. |
| D296,254 S | 6/1988 | Jaros et al. |
| 4,852,210 A | 8/1989 | Krajicek |
| 4,912,804 A | 4/1990 | Pasbol |
| 5,094,559 A | 3/1992 | Rivera et al. |
| 5,115,535 A | 5/1992 | Casademunt Ferre et al. |
| 5,131,111 A | 7/1992 | Richardson et al. |
| 5,191,166 A | 3/1993 | Smirlock et al. |
| D338,299 S | 8/1993 | Delmerico et al. |
| 5,274,877 A | 1/1994 | Morad et al. |
| 5,333,353 A | 8/1994 | Taylor |
| D358,238 S | 5/1995 | Barnett |
| 5,414,892 A | 5/1995 | Clark, Jr. |
| 5,419,015 A | 5/1995 | Garcia |
| 5,438,427 A | 8/1995 | Yoshida |
| 5,438,727 A | 8/1995 | Specht |
| 5,440,778 A | 8/1995 | De Guzman |
| D362,941 S | 10/1995 | Delmerico et al. |
| 5,548,865 A | 8/1996 | Pagani |
| D374,321 S | 10/1996 | Mandell et al. |
| 5,774,929 A | 7/1998 | Jurgens et al. |
| 5,836,039 A | 11/1998 | Rimer |
| D402,776 S | 12/1998 | Carlson |
| D404,862 S | 1/1999 | Johnson |
| 5,864,914 A | 2/1999 | Salmon |
| 5,915,437 A | 6/1999 | Petner |
| 5,918,343 A | 7/1999 | Young |
| 5,945,193 A | 8/1999 | Pollard et al. |
| D417,051 S | 11/1999 | Dickinson et al. |
| 5,983,441 A | 11/1999 | Williams et al. |
| 6,062,389 A | 5/2000 | Kent |
| D426,361 S | 6/2000 | Young |
| 6,115,877 A | 9/2000 | Morad et al. |
| 6,115,878 A | 9/2000 | McLaughlin et al. |
| 6,128,803 A | 10/2000 | Dickinson et al. |
| 6,158,089 A | 12/2000 | Monahan et al. |
| 6,260,226 B1 | 7/2001 | Specht |
| 6,279,195 B1 | 8/2001 | Biggs |
| 6,283,170 B1 | 9/2001 | Robinson |
| 6,374,867 B1 | 4/2002 | Maiuro |
| 6,457,203 B1 | 10/2002 | Williams et al. |
| 6,460,230 B2 | 10/2002 | Shimamura et al. |
| 6,487,745 B2 | 12/2002 | Specht |
| 6,543,081 B1 | 4/2003 | Cohen |
| D477,447 S | 7/2003 | Calaicone |
| 6,588,045 B2 | 7/2003 | Fernandez |
| 6,640,348 B1 | 11/2003 | Clune et al. |
| 6,671,923 B2 | 1/2004 | Gromnicki |
| D489,852 S | 5/2004 | Perelli |
| 6,737,147 B2 | 5/2004 | Kennedy et al. |
| D490,952 S | 6/2004 | Ajluni |
| D494,721 S | 8/2004 | Kotani |
| 6,810,554 B2 | 11/2004 | McKay |
| D503,836 S | 4/2005 | Hall et al. |
| D506,050 S | 6/2005 | Lalanne et al. |
| 6,996,873 B2 | 2/2006 | Salmon |
| D525,404 S | 7/2006 | Petner et al. |
| D527,506 S | 8/2006 | Camp, Jr. et al. |
| D528,729 S | 9/2006 | Van Landingham, Jr. |
| D530,870 S | 10/2006 | Lauer |
| D531,368 S | 10/2006 | Lauer |
| D531,772 S | 11/2006 | Lauer |
| D533,705 S | 12/2006 | Bertucci et al. |
| D533,977 S | 12/2006 | Bensussan et al. |
| D536,851 S | 2/2007 | Lauer |
| 7,174,600 B2 | 2/2007 | Kresse et al. |
| D542,494 S | 5/2007 | Lauer et al. |
| D542,992 S | 5/2007 | Lauer |
| D546,012 S | 7/2007 | Casteel et al. |
| D548,913 S | 8/2007 | Van Landingham, Jr. |
| 7,254,863 B1 | 8/2007 | Morad |
| D550,418 S | 9/2007 | Weaver et al. |
| D554,815 S | 11/2007 | Harper et al. |
| 7,293,317 B2 | 11/2007 | Tsuchiya et al. |
| D563,068 S | 2/2008 | Jiang |
| 7,516,508 B2 | 4/2009 | Stackpole, Jr. et al. |
| 7,536,743 B2 | 5/2009 | Goh et al. |
| D597,718 S | 8/2009 | McNeil et al. |
| 7,607,191 B2 | 10/2009 | Morris et al. |
| D615,260 S | 5/2010 | Koenig |
| D617,066 S | 6/2010 | Koenig |
| 7,827,649 B2 | 11/2010 | Horian |
| 7,946,445 B2 | 5/2011 | Tytar |
| D643,982 S | 8/2011 | Franklin |
| D644,386 S | 8/2011 | Tawara |
| 8,056,178 B2 | 11/2011 | Bar-Noy et al. |
| 8,099,824 B2 | 1/2012 | Dingert et al. |
| D653,826 S | 2/2012 | Lee |
| D657,928 S | 4/2012 | Byrne |
| D658,836 S | 5/2012 | Ediger |
| D677,031 S | 2/2013 | Best |
| 8,381,931 B1 | 2/2013 | Ernest, III |
| 8,393,047 B2 | 3/2013 | Van Landingham, Jr. et al. |
| 8,419,024 B1 | 4/2013 | Arroyo-Ferrer |
| D684,329 S | 6/2013 | Church |
| 8,474,089 B2 | 7/2013 | Goentzel |
| 8,479,352 B2 | 7/2013 | Rivadulla Oliva |
| 8,544,141 B1 | 10/2013 | Kyde et al. |

(56) References Cited

U.S. PATENT DOCUMENTS

| | | | |
|---|---|---|---|
| 8,567,616 B2 | 10/2013 | Mishan et al. | |
| 8,584,300 B2 | 11/2013 | Weis | |
| D694,975 S | 12/2013 | Lambertson, Jr. et al. | |
| D694,977 S | 12/2013 | Libman | |
| D694,979 S | 12/2013 | Lambertson, Jr. et al. | |
| 8,652,263 B2 | 2/2014 | Goentzel | |
| 8,701,238 B1 | 4/2014 | Morad et al. | |
| 8,771,428 B1 | 7/2014 | Goentzel | |
| D720,906 S | 1/2015 | Baldwin | |
| D723,233 S | 2/2015 | Gidwell et al. | |
| 8,990,998 B1 | 3/2015 | McBride, Jr. et al. | |
| D728,883 S | 5/2015 | Kempton | |
| D728,884 S | 5/2015 | Waffensmith et al. | |
| 9,161,673 B2 | 10/2015 | Tronconi et al. | |
| D742,609 S | 11/2015 | Irwin | |
| 9,216,751 B2 | 12/2015 | Adams et al. | |
| D759,926 S | 6/2016 | Leonard et al. | |
| D766,528 S | 9/2016 | Choi | |
| 9,433,335 B2 | 9/2016 | Nolan et al. | |
| 9,504,366 B2 | 11/2016 | Kasper et al. | |
| D792,043 S | 7/2017 | Buckley et al. | |
| D793,639 S | 8/2017 | Schuller | |
| D801,610 S | 10/2017 | Nadin | |
| 9,932,056 B2 | 4/2018 | Eisenhut et al. | |
| 9,943,207 B1 | 4/2018 | Patterson | |
| D824,627 S | 7/2018 | Brugora | |
| 10,743,737 B1 | 8/2020 | Parrott | |
| 10,858,139 B2 | 12/2020 | Fason | |
| D922,712 S | 6/2021 | Harrington et al. | |
| D923,896 S | 6/2021 | Harrington et al. | |
| D955,075 S | 6/2022 | Harrington et al. | |
| D962,575 S | 8/2022 | Harrington et al. | |
| 11,576,550 B2 | 2/2023 | Huda et al. | |
| 2002/0120997 A1 | 9/2002 | Alt | |
| 2003/0019954 A1 | 1/2003 | Clarke | |
| 2003/0121530 A1 | 7/2003 | Borgonjon et al. | |
| 2004/0074520 A1 | 4/2004 | Truong et al. | |
| 2004/0128786 A1 | 7/2004 | Policicchio et al. | |
| 2004/0139585 A1 | 7/2004 | McVicker | |
| 2004/0231700 A1 | 11/2004 | Bell et al. | |
| 2005/0086760 A1 | 4/2005 | Young | |
| 2005/0086980 A1 | 4/2005 | Young | |
| 2005/0100403 A1 | 5/2005 | Kruepke | |
| 2005/0229352 A1 | 10/2005 | LeCompte et al. | |
| 2006/0018706 A1 | 1/2006 | Bensussan et al. | |
| 2006/0048327 A1 | 3/2006 | Lacotta et al. | |
| 2006/0048330 A1 | 3/2006 | Rust et al. | |
| 2006/0070196 A1 | 4/2006 | Lacotta et al. | |
| 2006/0151054 A1 | 7/2006 | Deaton | |
| 2006/0213021 A1 | 9/2006 | Ducharme | |
| 2006/0272115 A1 | 12/2006 | Kacher et al. | |
| 2007/0026181 A1 | 2/2007 | Roberts | |
| 2007/0061985 A1 | 3/2007 | Fischer | |
| 2007/0074365 A1 | 4/2007 | Erdman et al. | |
| 2007/0107155 A1 | 5/2007 | Kacher et al. | |
| 2007/0134465 A1 | 6/2007 | Vanbenschoten et al. | |
| 2007/0266518 A1 | 11/2007 | Hoyle et al. | |
| 2007/0289084 A1 | 12/2007 | Damrath et al. | |
| 2008/0006640 A1 | 1/2008 | Natale | |
| 2008/0141477 A1 | 6/2008 | Damrath et al. | |
| 2008/0155775 A1 | 7/2008 | Damrath et al. | |
| 2009/0007351 A1 | 1/2009 | Horian | |
| 2009/0035507 A1 | 2/2009 | Kurtz, Jr. | |
| 2009/0035509 A1 | 2/2009 | Kurtz, Jr. | |
| 2010/0050363 A1 | 3/2010 | Young | |
| 2011/0010900 A1 | 1/2011 | Gilardi | |
| 2011/0099745 A1 | 5/2011 | Van Landingham, Jr. et al. | |
| 2011/0203613 A1 | 8/2011 | Roberts | |
| 2012/0042462 A1 | 2/2012 | Milanese et al. | |
| 2012/0096668 A1 | 4/2012 | Treacy | |
| 2012/0110774 A1 | 5/2012 | Matola | |
| 2012/0145189 A1 | 6/2012 | Knopow et al. | |
| 2012/0151703 A1 | 6/2012 | Chow | |
| 2013/0312211 A1 | 11/2013 | Matola | |
| 2014/0215739 A1 | 8/2014 | Lindner et al. | |
| 2014/0263105 A1 | 9/2014 | Kontorovich et al. | |
| 2014/0289985 A1 | 10/2014 | Hoying et al. | |
| 2015/0201821 A1 | 7/2015 | McBride, Jr. et al. | |
| 2015/0305590 A1 | 10/2015 | Rashid | |
| 2015/0351603 A1 | 12/2015 | Katsnelson | |
| 2016/0068176 A1 | 3/2016 | Adams et al. | |
| 2016/0113471 A1 | 4/2016 | Zhu et al. | |
| 2016/0128540 A1 | 5/2016 | Hoying et al. | |
| 2016/0309980 A1 | 10/2016 | LeCompte et al. | |
| 2016/0316988 A1 | 11/2016 | Balz et al. | |
| 2017/0027403 A1 | 2/2017 | Zhu | |
| 2017/0049292 A1 | 2/2017 | Harrington et al. | |
| 2017/0086637 A1 | 3/2017 | Zhu et al. | |
| 2017/0231457 A1 | 8/2017 | Cloud | |
| 2017/0369342 A1 | 12/2017 | Hom et al. | |
| 2018/0035862 A1 | 2/2018 | Polti et al. | |
| 2018/0055327 A1 | 3/2018 | Li | |
| 2018/0199788 A1 | 7/2018 | Huang | |
| 2019/0365186 A1 | 12/2019 | Buckley et al. | |
| 2019/0365191 A1 | 12/2019 | Huda et al. | |
| 2019/0365193 A1 | 12/2019 | Smith et al. | |
| 2021/0177229 A1 | 6/2021 | Smith et al. | |

FOREIGN PATENT DOCUMENTS

| | | | |
|---|---|---|---|
| CA | 1306592 C | | 8/1992 |
| CA | 2993591 A1 | | 12/2017 |
| CN | 2081281 U | | 7/1991 |
| CN | 200987655 Y | | 12/2007 |
| CN | 201227258 Y | | 4/2009 |
| CN | 201227259 Y | | 4/2009 |
| CN | 201384477 Y | | 1/2010 |
| CN | 101843468 A | | 9/2010 |
| CN | 201675888 U | | 12/2010 |
| CN | 202211661 U | | 5/2012 |
| CN | 202313166 U | | 7/2012 |
| CN | 102711578 A | | 10/2012 |
| CN | 102846284 A | | 1/2013 |
| CN | 202821248 U | | 3/2013 |
| CN | 103068292 A | * | 4/2013 |
| CN | 203029178 U | | 7/2013 |
| CN | 103445735 A | | 12/2013 |
| CN | 204146974 U | | 2/2015 |
| CN | 104853664 A | | 8/2015 |
| CN | 303421390 | | 10/2015 |
| CN | 204744046 U | | 11/2015 |
| CN | 204889883 U | | 12/2015 |
| CN | 105286740 A | | 2/2016 |
| CN | 105640460 A | | 6/2016 |
| CN | 105769071 A | | 7/2016 |
| CN | 205391076 U | | 7/2016 |
| CN | 205493747 U | | 8/2016 |
| CN | 105996932 A | | 10/2016 |
| CN | 205625834 U | | 10/2016 |
| CN | 205697619 U | | 11/2016 |
| CN | 205729277 U | | 11/2016 |
| CN | 205831737 U | | 12/2016 |
| CN | 205866707 U | | 1/2017 |
| CN | 206080445 U | | 4/2017 |
| CN | 206080446 U | | 4/2017 |
| CN | 106725163 A | | 5/2017 |
| CN | 106725164 A | | 5/2017 |
| CN | 206151396 U | | 5/2017 |
| CN | 206183214 U | | 5/2017 |
| CN | 206381142 U | | 8/2017 |
| CN | 107115077 A | | 9/2017 |
| CN | 206548456 U | | 10/2017 |
| CN | 107456178 A | | 12/2017 |
| CN | 107456179 A | | 12/2017 |
| CN | 107456180 A | | 12/2017 |
| CN | 107456181 A | | 12/2017 |
| CN | 107456184 A | | 12/2017 |
| CN | 107456185 A | | 12/2017 |
| CN | 107495914 A | | 12/2017 |
| CN | 107518843 A | | 12/2017 |
| CN | 206761652 U | | 12/2017 |
| CN | 107684406 A | | 2/2018 |
| CN | 107684407 A | | 2/2018 |
| CN | 107692938 A | | 2/2018 |

(56) References Cited

FOREIGN PATENT DOCUMENTS

| CN | 107811591 A | 3/2018 |
|---|---|---|
| CN | 207152550 U | 3/2018 |
| CN | 207186587 U | 4/2018 |
| CN | 207202839 U | 4/2018 |
| DE | 382754 C | 10/1923 |
| DE | 4318792 A1 | 12/1994 |
| DE | 19635620 A1 | 3/1998 |
| DE | 10065373 A1 | 7/2002 |
| DE | 102016118256 B3 | 1/2018 |
| EP | 0991355 A1 | 4/2000 |
| EP | 1219224 A1 | 7/2002 |
| EP | 1219226 A1 | 7/2002 |
| EP | 1651089 A1 | 5/2006 |
| EP | 2033565 A2 | 3/2009 |
| EP | 2769660 A1 | 8/2014 |
| EP | 2848178 A2 | 3/2015 |
| FR | 3058627 A1 | 5/2018 |
| GB | 232798 A | 4/1925 |
| GB | 379946 A | 9/1932 |
| GB | 396469 A | 8/1933 |
| GB | 932579 A | 7/1963 |
| GB | 1168635 A | 10/1969 |
| GB | 1277932 A | 6/1972 |
| JP | H10-304998 A | 11/1998 |
| JP | 2014-030815 A | 2/2014 |
| KR | 485755 Y1 | 2/2018 |
| KR | 20180025263 A | 3/2018 |
| NO | 2007/046211 A1 | 4/2007 |
| WO | 1992/10968 A1 | 7/1992 |
| WO | 2000/001328 A1 | 1/2000 |
| WO | 2002/000089 A1 | 1/2002 |
| WO | 2004/080265 A2 | 9/2004 |
| WO | 2005/013794 A1 | 2/2005 |
| WO | 2006/027383 A1 | 3/2006 |
| WO | 2006/074687 A1 | 7/2006 |
| WO | 2015/090356 A1 | 6/2015 |
| WO | 2016/116067 A1 | 7/2016 |
| WO | 2017/193609 A1 | 11/2017 |
| WO | 2017/206511 A1 | 12/2017 |
| WO | 2018/024160 A1 | 2/2018 |
| WO | 2018/040920 A1 | 3/2018 |

OTHER PUBLICATIONS

European Office Action for Application No. 19810953.0, dated Mar. 11, 2022, 7 pages.
European Office Action for Application No. 19810956.3, dated Feb. 10, 2022, 5 pages.
European Office Action for Application No. 19810211.3, dated Mar. 14, 2022, 5 pages.
European Office Action for Application No. 19811600.6, dated Mar. 16, 2022, 5 pages.
International Search Report and Written Opinion for Application No. PCT/US2019/034277, dated Oct. 4, 2019, 19 pages.
International Search Report and Written Opinion for Application No. PCT/US2019/034281, dated Aug. 20, 2019, 15 pages.
International Search Report and Written Opinion for Application No. PCT/US2019/034280, dated Aug. 22, 2019, 33 pages.
Amazon.com, Unger CLBK1 Dual Bucket Omniclean Kit. Retrieved online at: https://www.amazon.com/Unger-CLBK1-OmniClean-Dual-Bucket/dp/B08PMDRDJ5/ref=sr_1_1?crid=2S8W1G9M8FLLQ &keywords=Unger+CLBK1+Dual+Bucket+Omniclean+Kit&qid= 1695732356&sprefix=unger+clbk1+dual+bucket+omniclean+kit% 2Caps%2C88&sr=8-1. 6 pages, (2020).
Unger, OmniClean, Always Mop with Clean Water. Retrieved online at: http://usa.ungerglobal.com/product-category/unger-omniclean/. 4 pages, (2020).

\* cited by examiner

Section A-A

FLAT HEADED MOP AND METHOD OF OPERATION

CROSS-REFERENCE TO RELATED APPLICATIONS

The present application is a divisional application of U.S. Nonprovisional application Ser. No. 16/423,804 filed on May 28, 2019, which claims the benefit of U.S. Provisional Application Ser. No. 62/677,376 filed on May 29, 2018, U.S. Provisional Application Ser. No. 62/695,486 filed on Jul. 9, 2018, U.S. Provisional Application Ser. No. 62/767,579 filed on Nov. 15, 2018, U.S. Provisional Application Ser. No. 62/795,239 filed on Jan. 22, 2019, and U.S. Provisional Application Ser. No. 62/833,255 filed on Apr. 12, 2019, the contents of all of which are incorporated by reference herein in their entirety.

BACKGROUND

The subject matter disclosed herein relates to a mop for cleaning surfaces, such as a floor, and in particular to a flat mop that automatically configures the mop head when lifted from the surface being cleaned.

Mops have been traditionally used to clean floors. Mops come in different styles, such as a string, strip, foam or flat mop for example. A flat mop has a generally planar end member with a flat microfiber pad coupled to one side. Further, one property of the microfiber pad is that it releases dirt when placed in water. The microfiber pad is then wrung-out, such as by pressing the mop head against a plate. One issue with many mop and bucket combinations it that the same water is used to both clean and recharge the microfiber pad. However, this means that the water used for recharging is dirty after the first time the microfiber pad is cleaned. Thus, after only a short while the user is left with a bucket of dirty water. If the water in this bucket is continued to be used, dirty water will be spread on the floor being cleaned.

A second issue that arises with current flat mops is the amount of water contained in the microfiber pad. Depending on the type of floor being cleaned, the desired amount of water will change. For example, when cleaning wood floors, it is desired to have only a small amount of water when compared to cleaning tile floors. The technique of pressing the microfiber pad against a plate is requires significant effort.

Accordingly, while existing mops are suitable for their intended purposes the need for improvement remains, particularly in providing a flat headed mop having the features described herein.

BRIEF DESCRIPTION

According to one aspect of the disclosure, a mop is provided. The mop includes a pole, a head member, and a hinge. The hinge being coupled between the head member and the pole. The hinge having a body with a first portion pivotally coupled to the head member about a first axis and a second portion pivotally coupled to the pole about a second axis, the first axis being perpendicular to the second axis. The hinge further having a biasing member coupled between the head member and the first portion, wherein the biasing member acts to rotate the head member against the pole.

In addition to one or more of the features described herein, or as an alternative, further embodiments of the mop may include the biasing member being an extension spring having an end coupled to the first portion offset from the first axis. In addition to one or more of the features described herein, or as an alternative, further embodiments of the mop may include the head member having a plate member and a cover member, the body being pivotally coupled to one of the plate member or the cover member. In addition to one or more of the features described herein, or as an alternative, further embodiments of the mop may include the cover member having a slot, wherein a portion of the pole rotates into the slot when the head member is lifted off of a surface under the biasing of the biasing member.

In addition to one or more of the features described herein, or as an alternative, further embodiments of the mop may include a third axis of the pole is substantially parallel to the body when the portion of the pole is rotated into the slot. In addition to one or more of the features described herein, or as an alternative, further embodiments of the mop may include the biasing member being coupled between the first portion of the body and the plate member.

In addition to one or more of the features described herein, or as an alternative, further embodiments of the mop may include the weight of the pole and the head member being larger than a torque generated by the biasing member, such that the head member remains flat on a surface when the head member is placed on the surface when a mop pad is dry.

In accordance with another embodiment, a flat headed mop is provided. The flat headed mop having a pole, a mop plate and a mop pad. The mop plate having a fastener on a side opposite the pole, the fastener comprising one part of a hook and loop fastener, the mop plate having a first edge and a second edge, the first edge being longer than the second edge. The mop pad is coupled to the mop plate by the fastener. A hinge coupled between the pole and the mop plate. A biasing member is coupled between the hinge and the mop plate, the biasing member biasing the mop plate into a first position wherein the first edge is substantially perpendicular to the pole and the second edge is substantially parallel to the pole.

In addition to one or more of the features described herein, or as an alternative, further embodiments of the flat headed mop may include the hinge comprising a clevis rotationally coupled about a first axis on a first end to the pole and rotationally coupled about a second axis on a second end to the mop plate. In addition to one or more of the features described herein, or as an alternative, further embodiments of the flat headed mop may include the biasing member being coupled to the second end at a position offset from the second axis.

In addition to one or more of the features described herein, or as an alternative, further embodiments of the flat headed mop may include the biasing member generating a biasing force of 0 oz-25 oz when in the first position and between 25 oz-80 oz when in a second position, the pole being on an angle greater than zero degrees to 90 degrees relative to the mop plate when in the second position. In addition to one or more of the features described herein, or as an alternative, further embodiments of the flat headed mop may include the biasing member being under tension in the first position and the second position. In addition to one or more of the features described herein, or as an alternative, further embodiments of the flat headed mop may include the mop plate further having a first post and a second post extending from a side opposite the mop pad, the first post and the second post being spaced apart such that the pole extends between the first post and the second post when the pole is in the first position.

In accordance with another embodiment, a method of using a flat headed mop is provided. The method comprising: cleaning a surface with the mop pad; rotating the mop head into the folded position at a instance with a biasing member coupled to a hinge assembly, the hinge assembly being disposed between the mop head and a mop pole; inserting the mop head into a first fluid to remove contaminants from the mop pad; and inserting the mop head into a wringing assembly to remove at least a portion of the first fluid.

In addition to one or more of the features described herein, or as an alternative, further embodiments of the method may include inserting the mop head into a second fluid to absorb a second fluid into the mop pad. In addition to one or more of the features described herein, or as an alternative, further embodiments of the method may include the mop head remaining in the same orientation when moving from the first fluid to the wringing assembly to the second fluid. In addition to one or more of the features described herein, or as an alternative, further embodiments of the method may include the mop head remaining in the folded position when moving from the first fluid to the wringing assembly to the second fluid.

In addition to one or more of the features described herein, or as an alternative, further embodiments of the method may include rubbing the mop pad against a cleaning plate when in the first fluid. In addition to one or more of the features described herein, or as an alternative, further embodiments of the method may include the removing of the at least a portion of the first fluid further including compressing the mop pad in the wringing assembly. In addition to one or more of the features described herein, or as an alternative, further embodiments of the method may include inserting the mop head into the wringing assembly after inserting the mop head into the second fluid.

Technical effects of embodiments of the present disclosure include a floor cleaning system that allows a floor to be cleaned or mopped while reducing or eliminating the spreading of contaminated or dirty fluids.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG.

Figure 1:
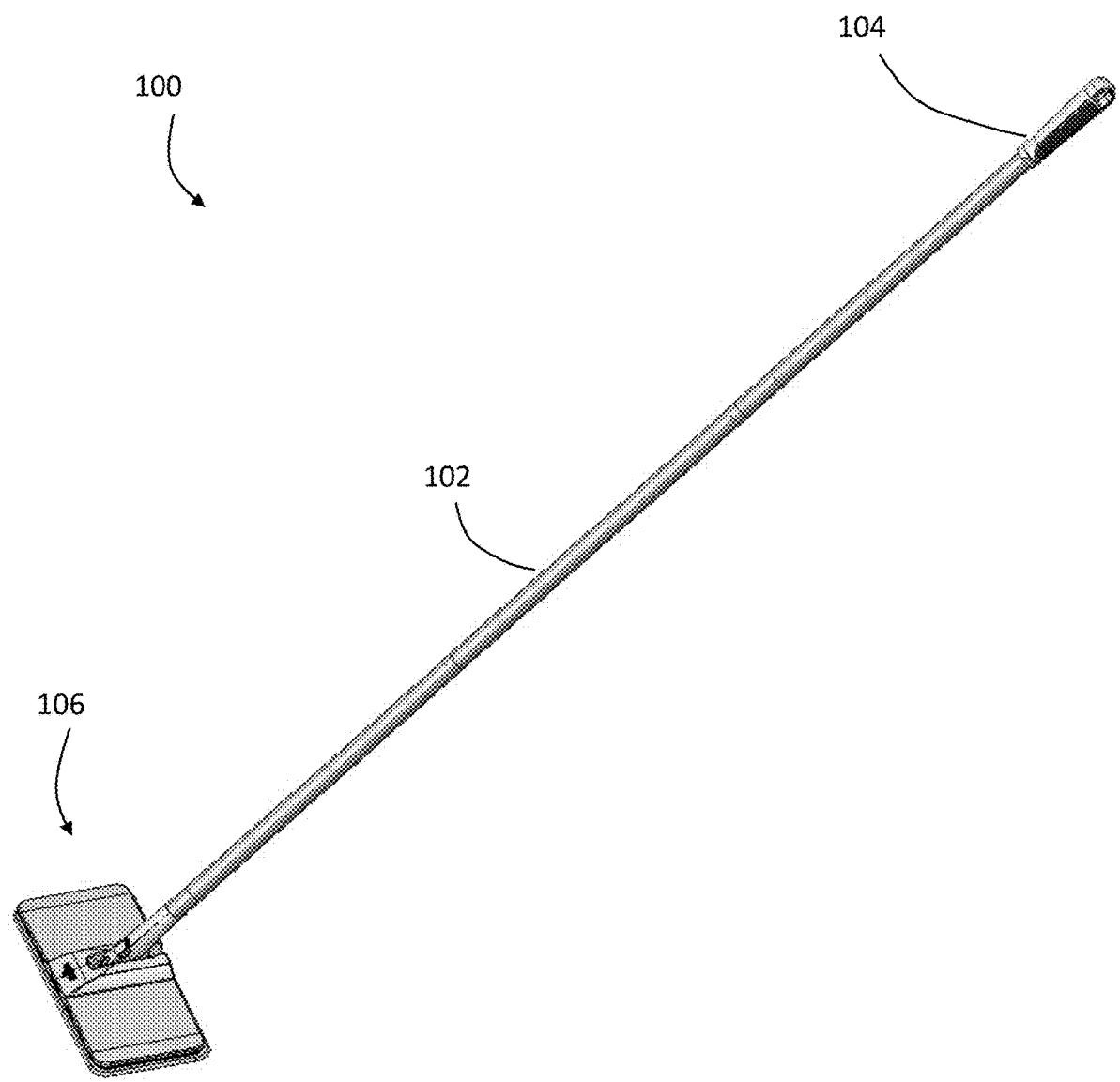
FIG. 1 is a perspective view of a flat headed mop assembly in accordance with an embodiment.
Figure 2:
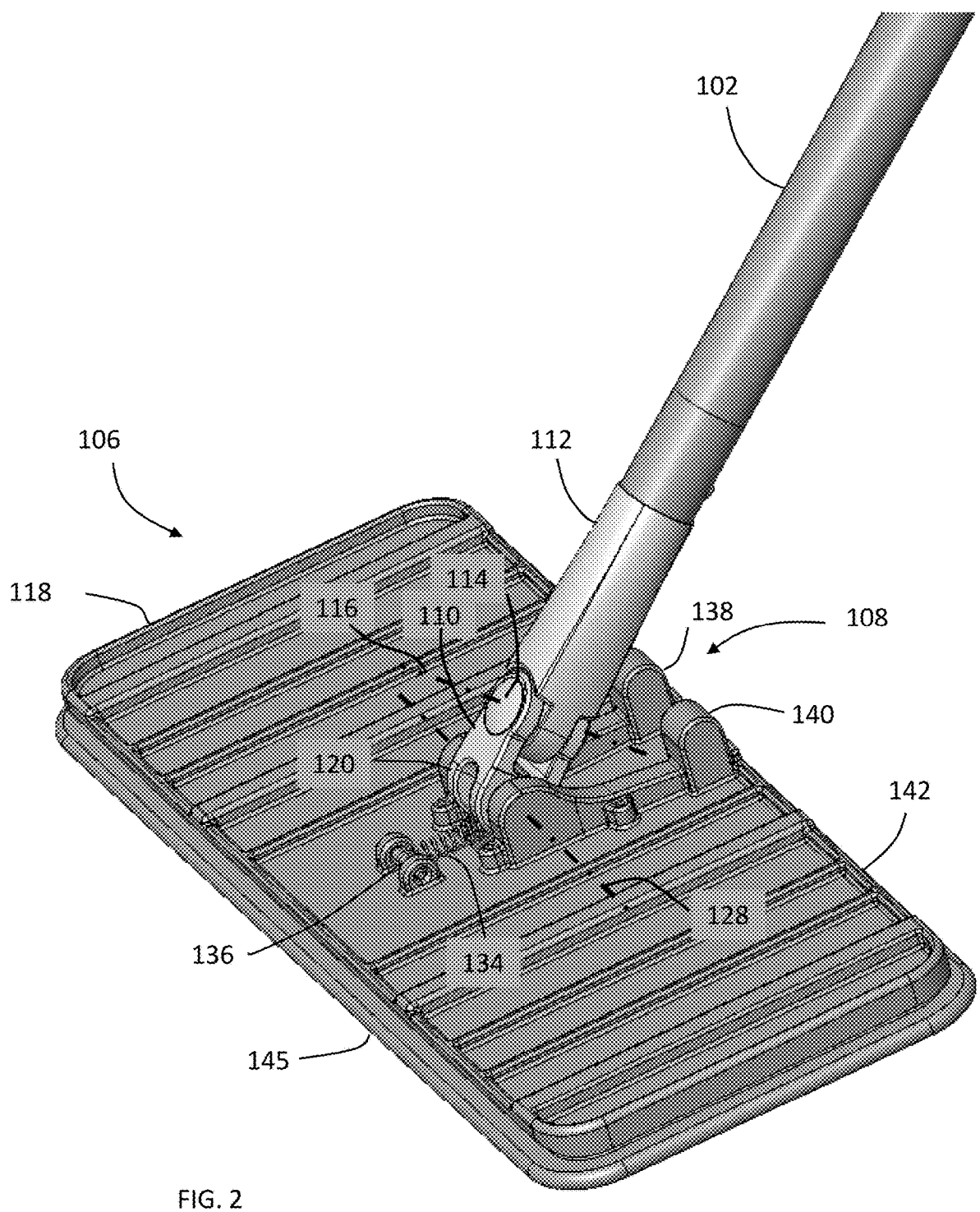
FIG. 2 is a partial perspective view of the mop head of the mop assembly of FIG. 1 with the cover removed.
Figure 3:
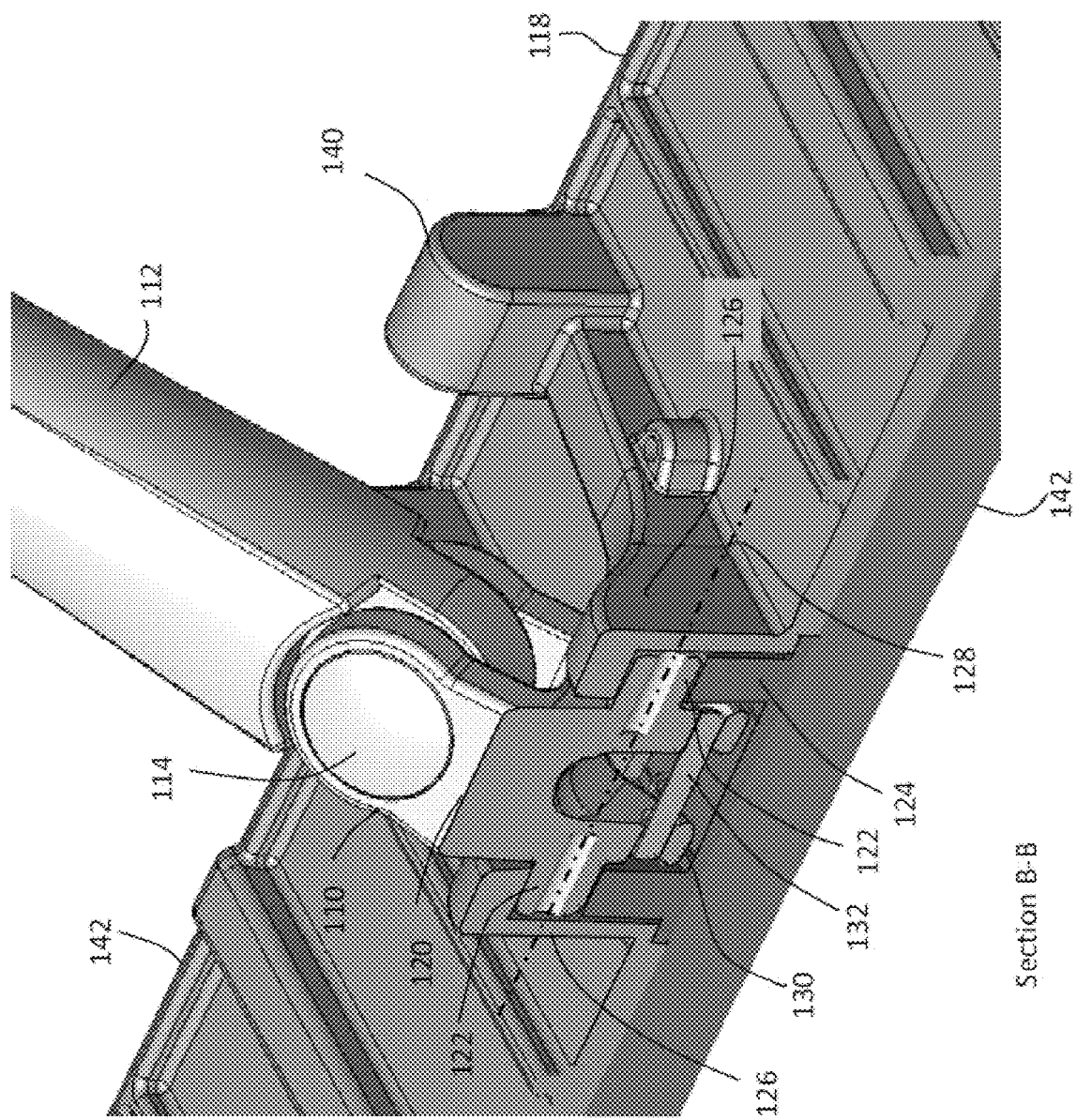
FIG. 3 is an enlarged partial sectional view of mop head and hinge assembly for the mop assembly of FIG. 1.

The detailed description explains embodiments of the disclosure, together with advantages and features, by way of example with reference to the drawings.

DETAILED DESCRIPTION

Embodiments disclosed herein provide for a flat mop with a microfiber pad for use in a bucket cleaning assembly. The mop includes a biasing assembly that automatically configures the mop head when it is lifted from a surface into a position for insertion into a wringing assembly in the bucket cleaning assembly.

Referring now to FIGS. 1-15, an embodiment is shown of a mop 100 for use in cleaning surfaces. In an embodiment, the mop 100 may be used with a bucket assembly 2100 for cleaning and recharging a mop pad. In an embodiment, the mop 100 includes a pole 102 having a gripping end 104 and a mop head 106. The mop head 106 is coupled to the pole 102 by a hinge assembly 108. The hinge assembly 108 includes a clevis 110 that is rotationally coupled to an adapter 112 by an axle 114. The axle 114 defines a first axis of rotation 116.

The opposite end 120 of the clevis 110 is rotationally coupled to the plate 118. The end 120 includes a pair of opposing pins 122 that rest in a saddle 124. The pins 122 are captured on the saddle 124 by a pair of projections 126 that extend from the plate 118. The pins 122, saddle 124, projection 126 assembly defines a second axis of rotation 128. The axis 128 is generally parallel to the plane of plate 118. The end 120 further includes a portion 130 that includes a pin 132. The pin 132 is offset from the second axis of rotation 128 and receives an end of a biasing member, such as extension spring 134. The spring 134 extends between the pin 132 and a second pin 136. The second pin is coupled to the plate 118. It should be appreciated that while embodiments herein refer to the biasing member as being an extension spring, this is for example purposes and the claims should not be so limited in other embodiments, other types of biasing members, such as torsion springs may be used, such as is shown in FIGS. 25-28 for example.

Figure 12:
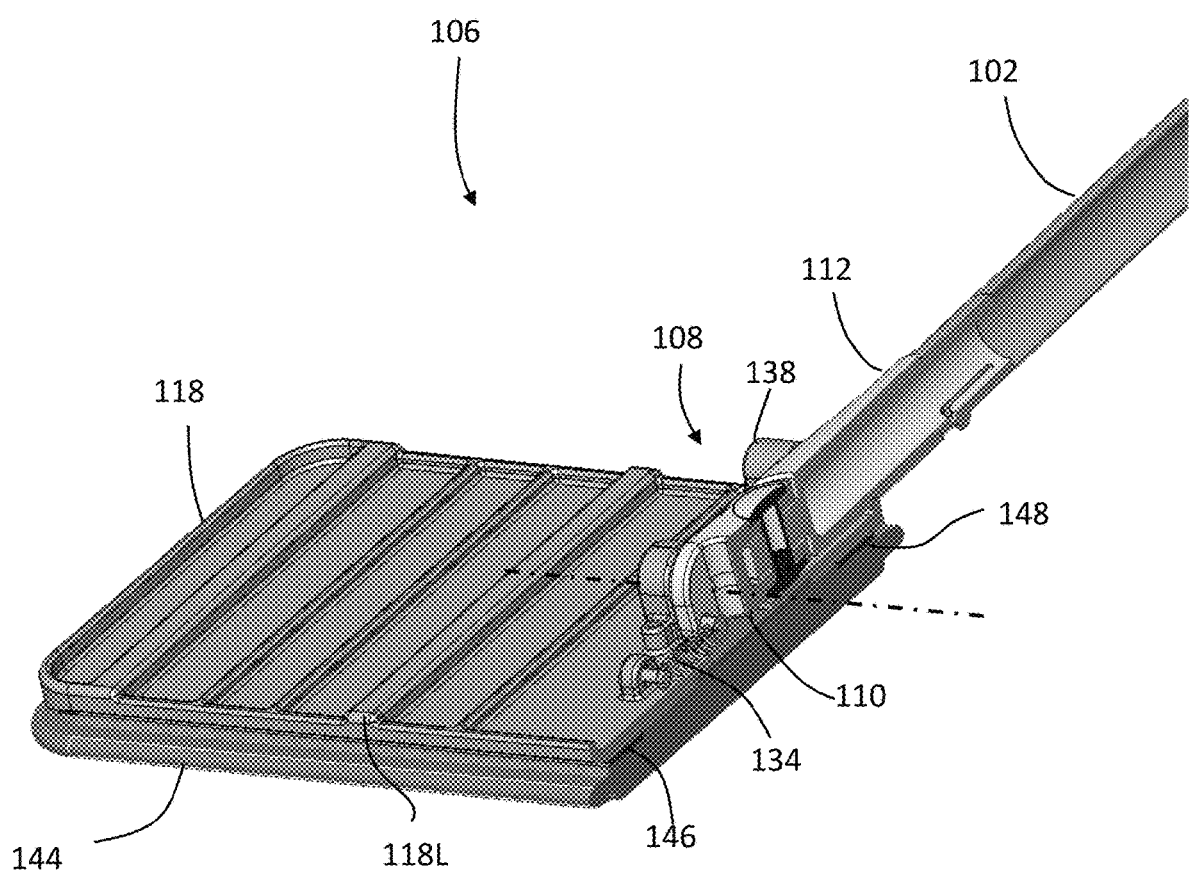
FIG. 12 and FIG. 13 are enlarged partial sectional views of the mop head and hinge assembly of the mop assembly of FIG. 1 with the mop head in the folded or vertical position.
Figure 13:
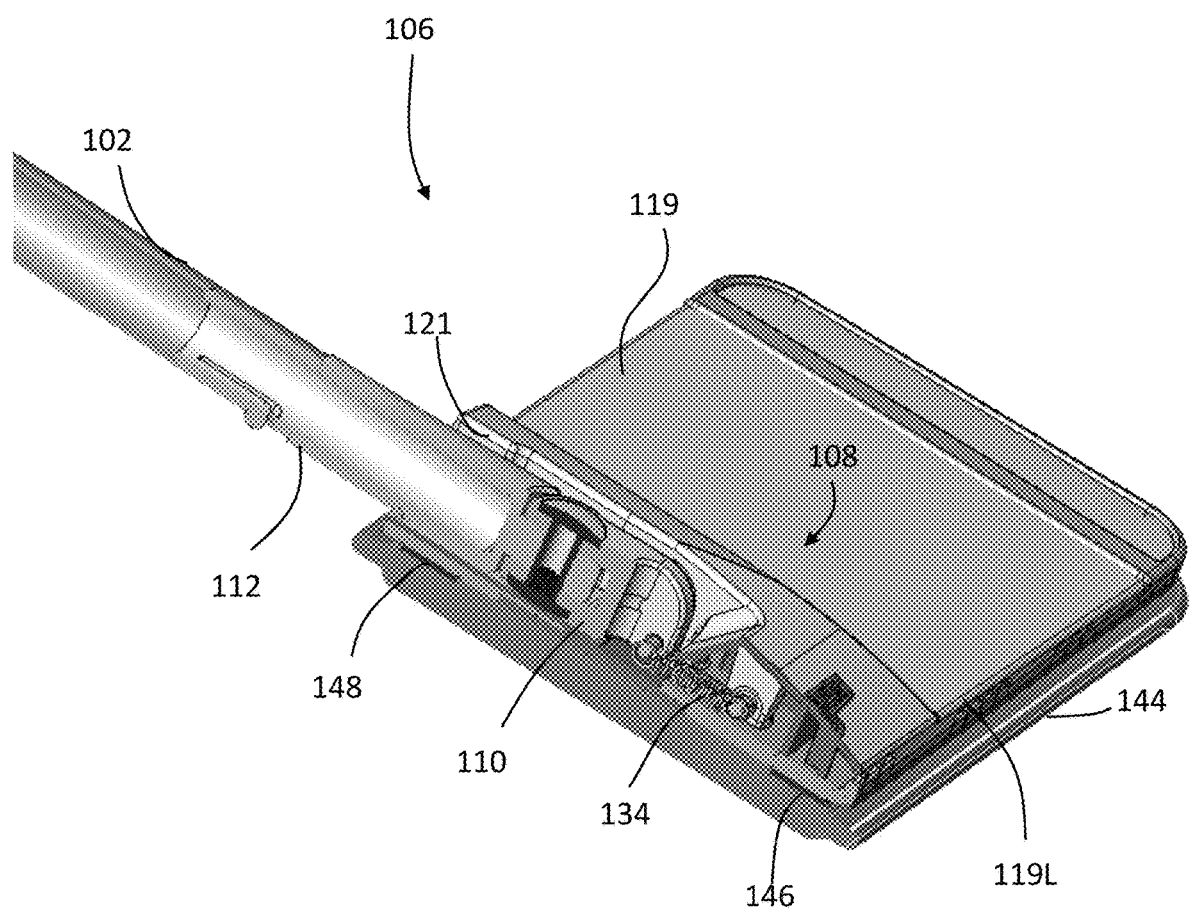
Figure 14:
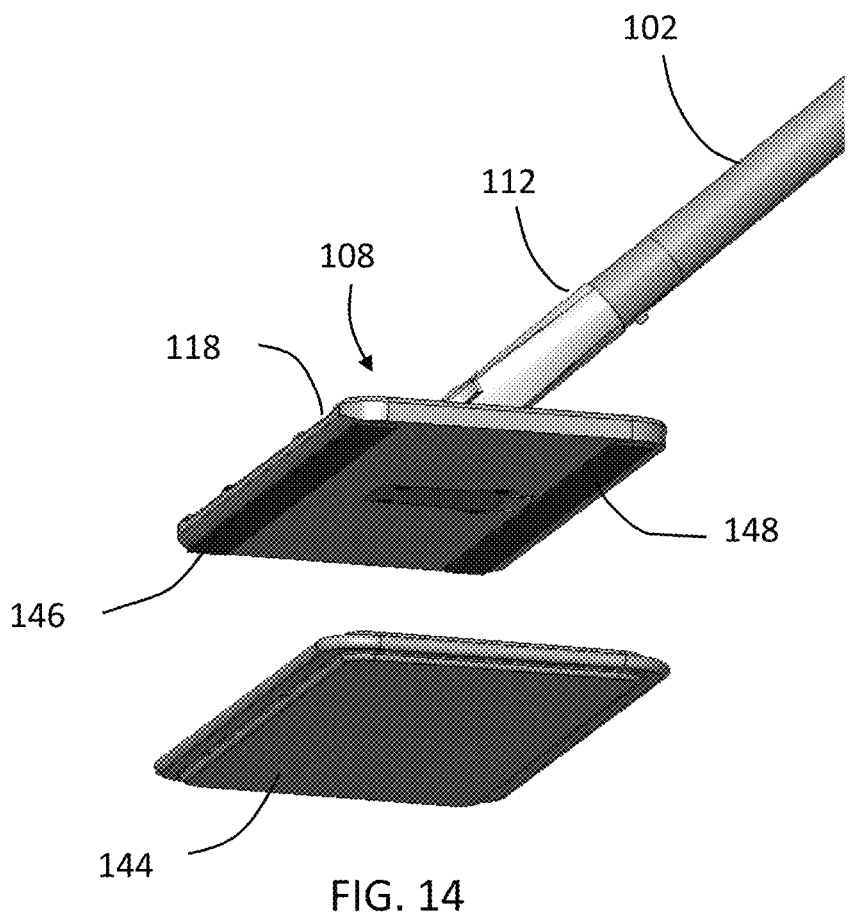
FIG. 14 and FIG. 15 are partial perspective unassembled views of the mop assembly of FIG. 1 with the cover removed.
Figure 15:
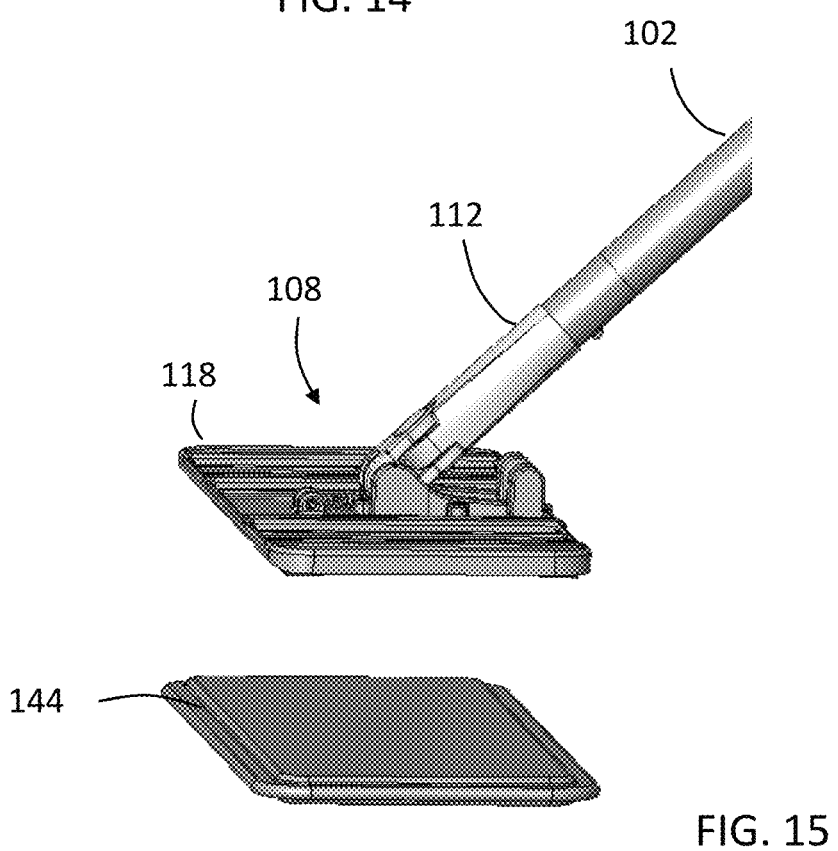
Figure 16:
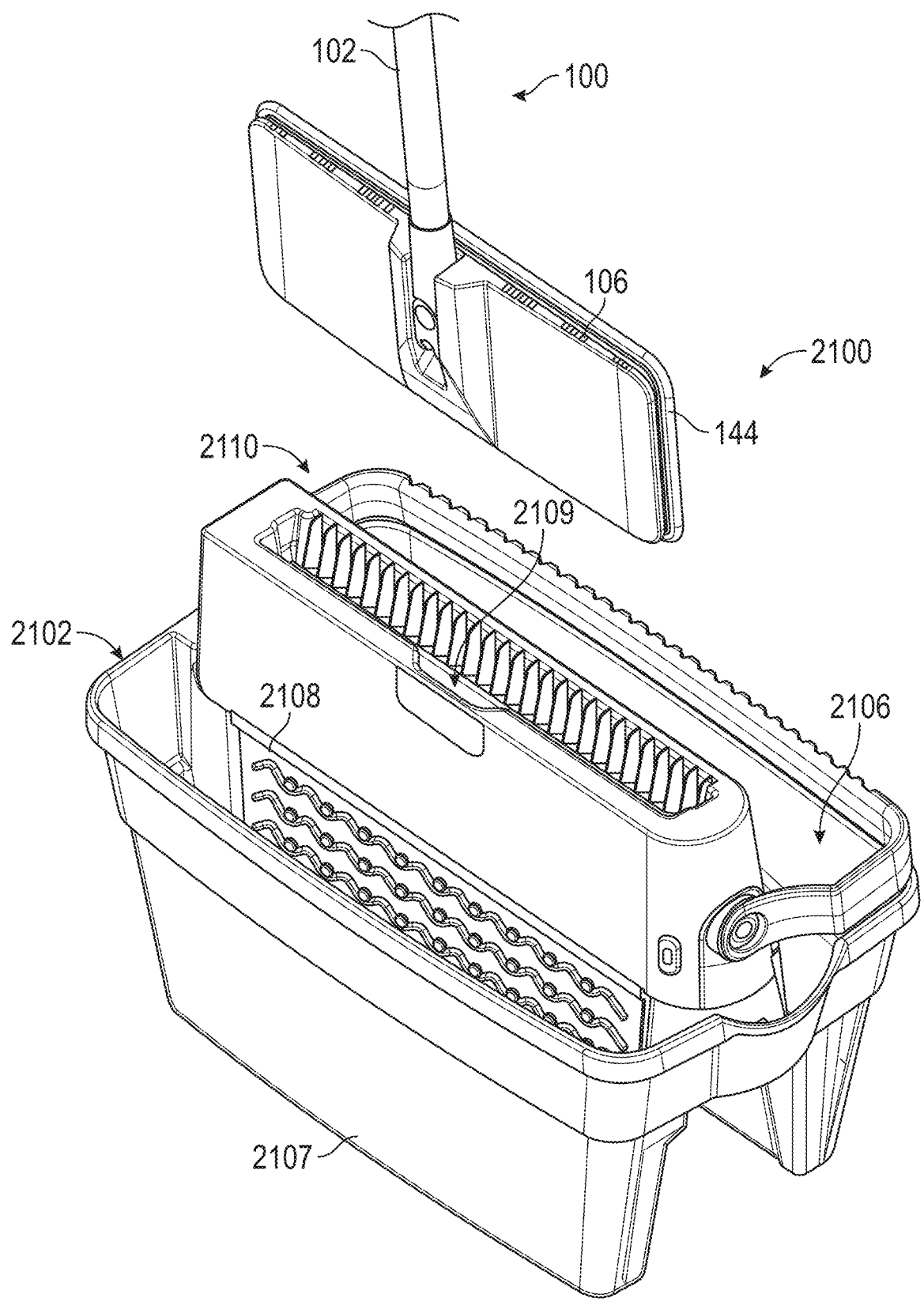
FIG. 16, 17, 18A, 18B and FIG. 19 illustrate a method of cleaning and recharging the mop assembly of FIG. 1.

The spring 134 in combination with the offset of pin 132 is arranged to bias the position of the plate 118 to fold flat against the adapter 112 to the position shown in 11, 12 and FIG. 13. When in this position, the adapter 112 is positioned between posts 138, 140 that extend from the plate 118. The posts 138, 140 provide advantages in preventing rotation of the clevis 110 as the mop head 106 is inserted into the wringing assembly. Thus the posts 138, 140 cooperate with the spring 134 and the lead-in surfaces 2216, 2218 (FIG. 18A, 18B) to facilitate the insertion and removal of the mop head 106 from the wringing assembly as the mop head is aligned and constrained relative to the pole. When so positioned, plate 118 remains against the adapter 112 and the pole 102 is substantially perpendicular to the edge 142 of the plate 118. It should be appreciated that the biasing by the spring 134 generates a torque that causes the plate 118 to rotate to the position of FIG. 10 and FIG. 12 whenever the mop head 106 is lifted off of the work surface being cleaned. In an embodiment, the force from spring 134 generates a torque that is less than a torque that would overcome the weight of the pole and mop head assembly. This provides advantages in that when the mop head 106 is lifted from the floor, the mop 100 automatically moves to a position that is suitable for insertion into a bucket or a wringer, such as the bucket assembly 2100 for example, while allowing the mop head to remain flat against the floor when the mop head is placed against the floor.

Figure 10:
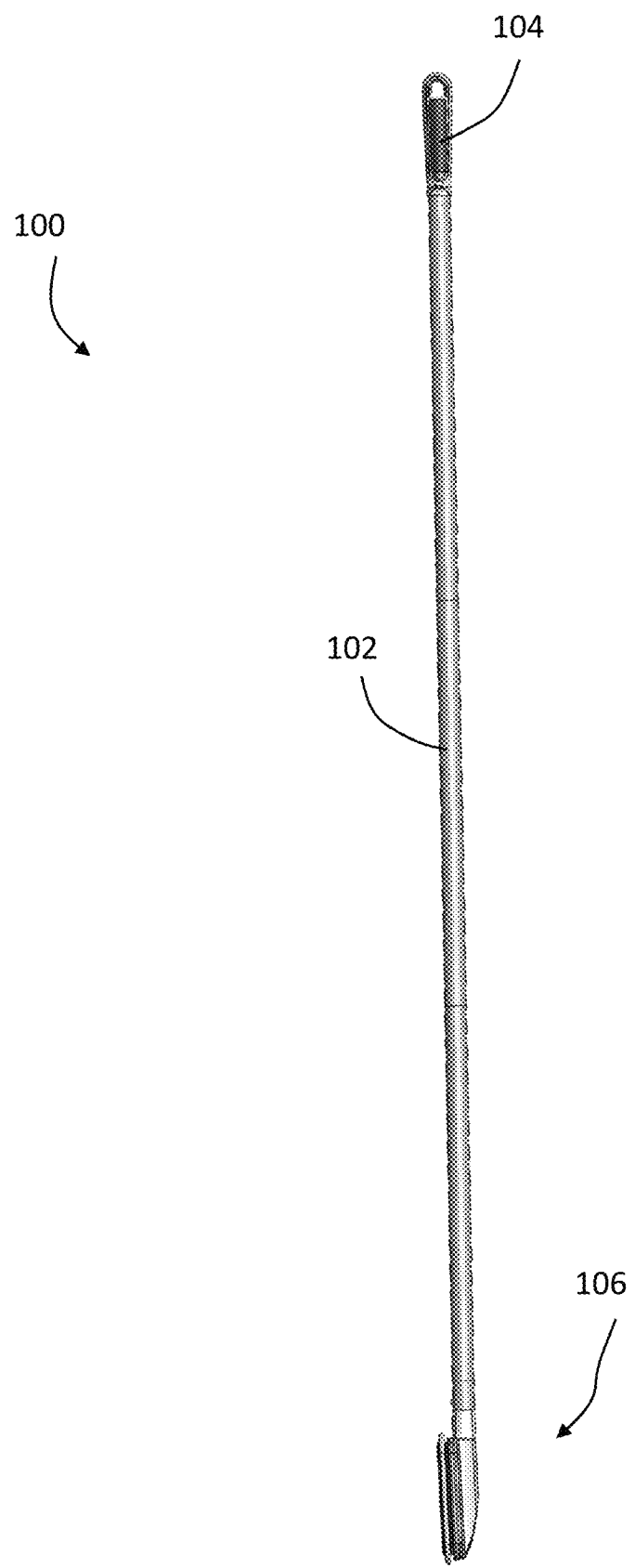
FIG. 10 is a side view of the mop assembly of FIG. 1 with the mop head in the folded or vertical position.
Figure 11:
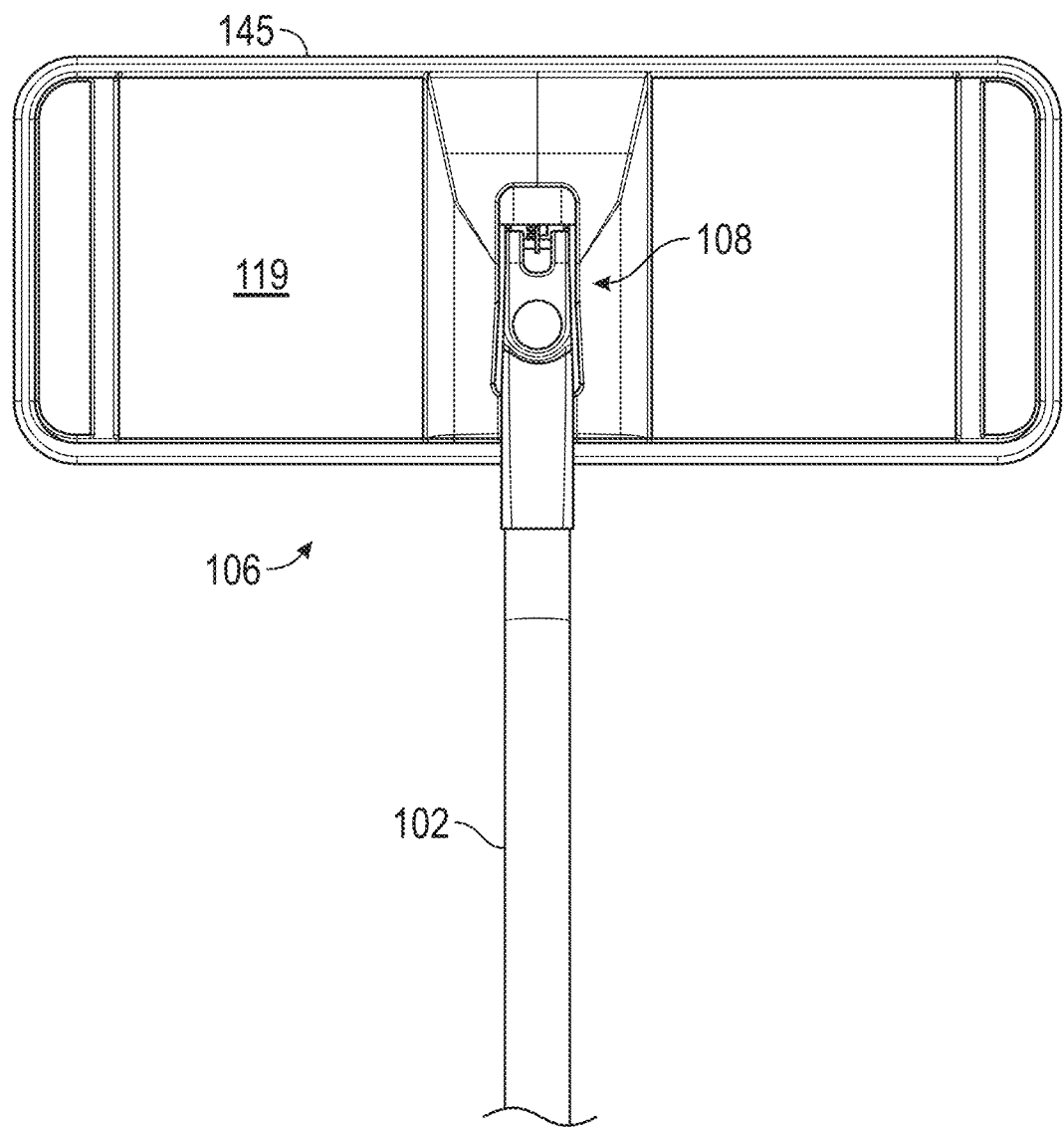
FIG. 11 is an enlarged partial side view of the mop assembly of FIG. 1.

In an embodiment, the force generated by the spring 134 may be overcome by the weight of the pole 102 to rotate the mop head 106 from the folded position of FIG. 10 to the operating position of FIG. 1 without application of additional forces by the end user. In an embodiment, the spring has a biasing force of 0-25 oz (0-6.95 Newtons) when the mop head 108 is in the folded position (FIG. 10), with biasing force of 14 oz (3.89 Newtons) being desired in an embodiment. In an embodiment, the spring has a biasing force of 10-80 oz (2.78-22.24 Newtons) when the mop head 106 is positioned perpendicular to the pole 102, with a biasing force of 51 oz (14.18 Newtons) being desired in an embodiment.

It should be appreciated that a constant spring force on the mop head may impact the mopping activity and would be noticeable to the user. However, since the spring force of the present embodiments is less than the weight of the pole and mop head assembly, the user does not notice the constant spring force.

In an embodiment, the mop head 106 may include a cover 119 that is coupled to the plate 118. The posts 138, 140 may be enclosed by the cover 119 such that the pole 102 and/or the adapter 112 is disposed between opposing surfaces 121 of the cover 119 when the mop head 106 is in the folded position (FIG. 13).

The mop head 106 further includes a mop pad 144 coupled to the plate 118 on a side opposite the hinge assembly 108. In an embodiment, the side of the plate 118 facing the mop pad 144 includes a pair of fasteners 146, 148 (FIG. 12), such a hook portion of a hook and loop fastener for example. In an embodiment, the force provided by spring 134 is sufficient to return the mop head 106 to the folded or retracted position of FIG. 10 when the mop pad 144 is fully saturated with a fluid (e.g. water, a chemical cleaning solution, or a combination of the foregoing). In another embodiment, the mop head 106 moves to the folded or retracted position when the mop pad 144 is dry. The fasteners 146, 148 engage the corresponding loops on the mop pad 144 to couple the mop pad 144 to the plate 118. In the illustrated embodiment, the mop pad 144 is secured to the plate 118 only by the fasteners 146, 148 without any pockets or features that couple or restrain the movement of the edges of the mop pad 144. In an embodiment, a portion of the hook and loop fasteners 146, 148 (e.g. the hooks) are integrally molded into the bottom surface of the plate 118. In another embodiment, a portion of the hook and loop fasteners 146, 148 (e.g. the hooks) is adhesively bonded to the bottom surface of the plate 118.

It should be appreciated that a user may not always couple the mop pad 144 in the center of the plate 118, resulting in the mop pad 144 being offset, misaligned or a combination thereof.

In an embodiment, the mop pad 144 may be a microfiber mop pad. The microfiber mop pad may be formed from multiple layers of microfiber. In an embodiment, the mop pad 144 includes a top layer (cleaning side) of microfiber loops made of cotton, sponge, foam, polyamide nylon (PA), polyester (P), or a blend of P and PA. A second or loop layer is disposed between the first layer and the plate 118 made from P or PA. In an embodiment, the loop layer engages the hooks on the mop plate. In still another embodiment, an absorbent layer is added between the microfiber and loop layers. The absorbent layer could be made of foam, microfibers or textile materials for example.

A portion of the hook and loop fastener (e.g. the loops) may be integrally formed in, or molded into the mop pad or may be mechanically or adhesively coupled to the mop pad. In an embodiment the hook portions of the hook and loop fastener are sewn into a strip of material, such as a plastic strip, and then slid into an aluminum extrusion that is coupled to the mop head. It should be appreciated that while the illustrated embodiment shows the fasteners 146, 148 as being located along the longitudinal edge of the bottom surface of the plate 118, in other embodiments, the fasteners 146, 148 may be spaced apart from the edge of the plate 118. In still further embodiments, more than two fasteners 146, 148 (e.g. three, four or five fasteners) may be disposed on the bottom surface of the plate 118. In an embodiment, single fastener is provided that is disposed over a substantial portion of the bottom surface of the plate 118.

Referring now to FIGS. 16-19, a method of operation is shown for the bucket assembly 2100 and mop 100. The user initiates the cleaning of a surface (e.g the floor) by placing fluid in the second compartment 2106 and fluid in first compartment 2102. The mop pad 144 is wetted by placing the mop head 106 in the second compartment 2106. The mop pad 144 may be wrung in the wringing assembly 2110 to the desired wetness. The wringing process is described in more detail herein. The user then proceeds to clean the surface by placing the mop pad 144 against the surface to be cleaned. As the mop pad 144 is placed against the surface, the mop head 106 rotates relative to the pole 102 by overcoming the biasing force of the spring 134. In one embodiment, the biasing force of the spring 134 is overcome by the weight of the pole 102.

Figure 17:
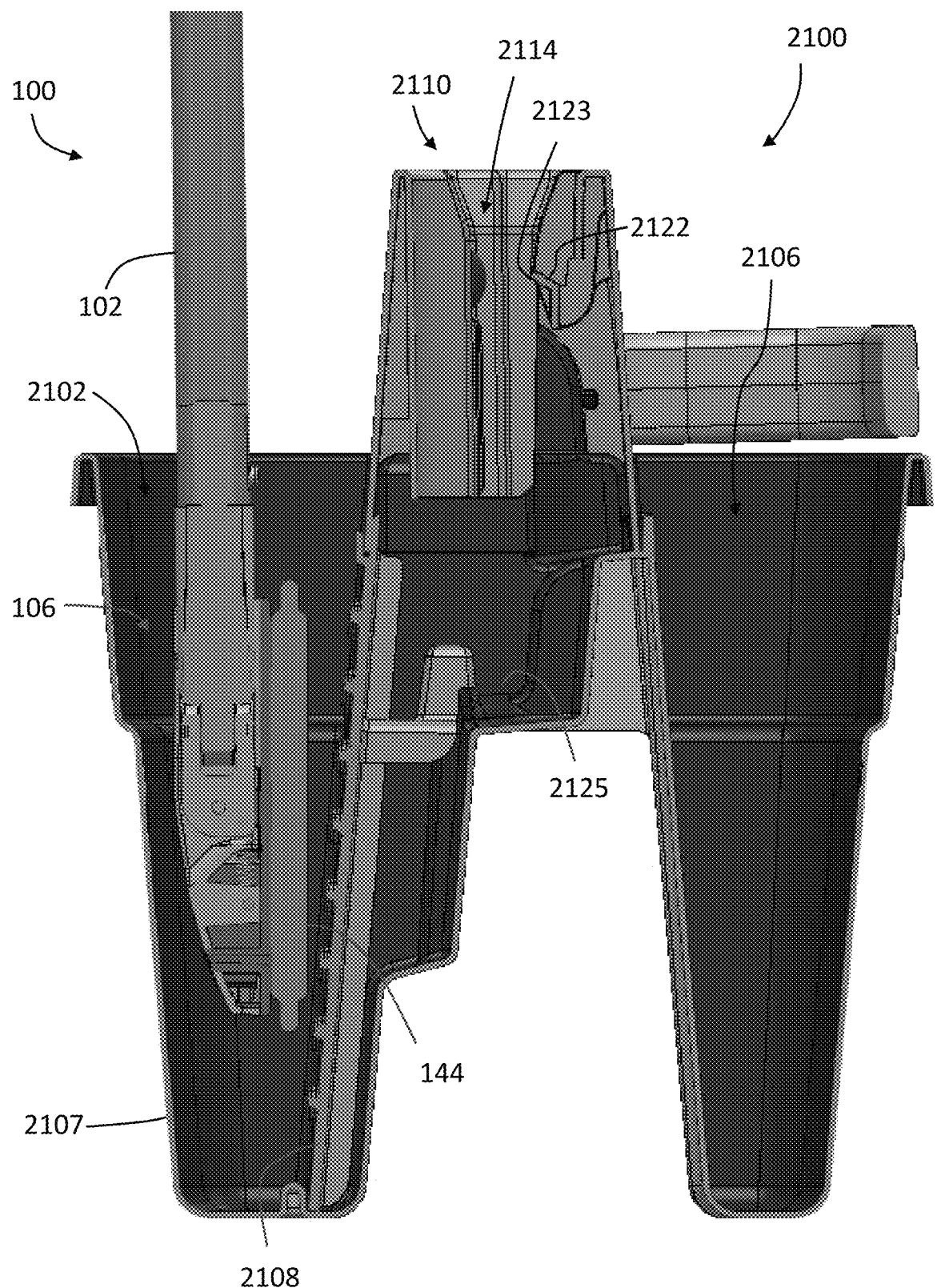

As the user wipes the mop pad 144 across the surface, dirt and debris from the surface will accumulate on the surface of the mop pad 144. Periodically, the user may desire to clean the mop pad 144 and recharge the mop pad 144 with new cleaning solution. The user lifts the mop head 106 from the surface being clean, which allows the mop head 106 to rotate to the position with the mop head 106 against the adapter 112 (FIG. 12). The mop head 106 is then inserted into the first compartment 2102 placing the dirty mop pad 144 into contact with the fluid within the first compartment 2102 (FIG. 17). It should be appreciated that the placing mop pad 144 in the fluid will cause dirt to be released from the fibers of the mop pad 144. The user may also optionally place the mop pad 144 against the cleaning plate 2108 and rub the mop pad 144 over the ribs and/or holes of the optional cleaning plate 2108, which agitates the fibers of the mop pad 144 further loosening any dirt or debris. The ribs of optional cleaning plate 2108 may in some embodiments be integrally formed or molded into the sidewall of the body 2107.

In an embodiment, the bucket may include one or more ribs disposed in the bottom of first compartment 2102. The ribs may be integral with the body 2107, or extend from the cleaning plate 2108. The ribs stop the travel of the mop head 106 to maintain the leading edge of the mop head 106 a desired distance from the bottom of the first compartment 2102. It should be appreciated that this keeps the mop pad 144 from contacting debris that may settle to the bottom of the first compartment 2102 or from the drained fluids flowing through the wringing assembly. It should be appreciated that this prevents or reduces the risk of fluids being reintroduced into the mop pad.

Figure 18A:
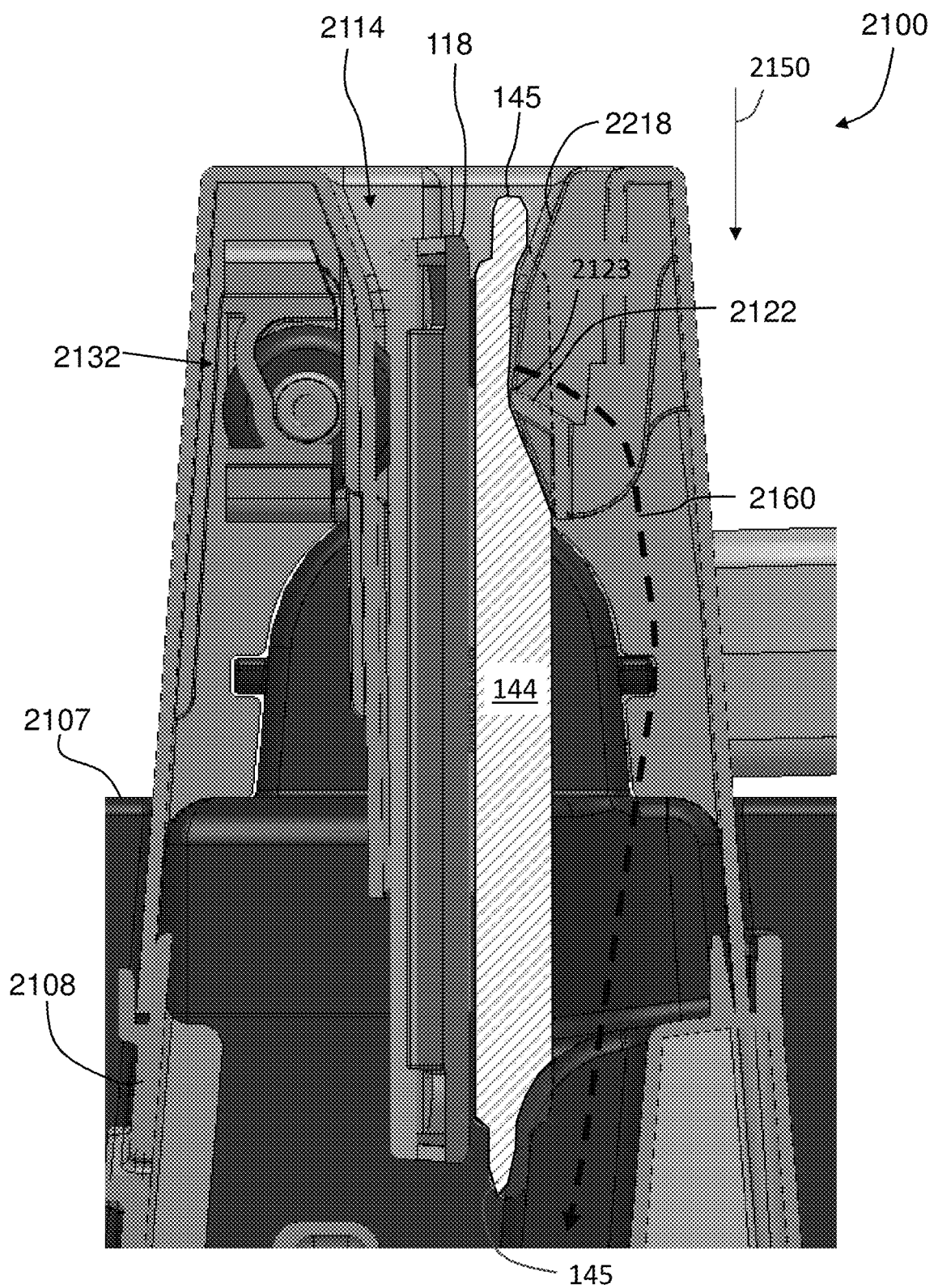

The user then removes the mop head 106 from the first compartment 2102 and inserts the mop head 106 into the wringing assembly 2110 (FIG. 18A). It should be noted that the wringing assembly is oriented such that the user may take the mop 100 directly from the first compartment 2102 into the wringing assembly 2110 without rotating or repositioning the mop head 106. In other words, the cleaning plate 2108 and the blade 2122 are oriented to directly engage the mop pad 144 without the user rotating the orientation of the mop head 106. Further, as the mop head 106 is inserted, the rollers 2132 contact the side of the cover 119 to keep the mop pad 144 engaged with the surface 2218. As the mop head 108 is inserted into the wringing assembly 2110 in the direction indicated by arrow 2150, the lead-in surface 2218 slowly compresses the mop pad 144. Fluid that is expressed from the mop pad 144 by the lead-in surface 2218 (or drips from the surface of the mop pad 144) flows through the openings in the surface 2218 as indicated by the arrow 2160.

Figure 4:
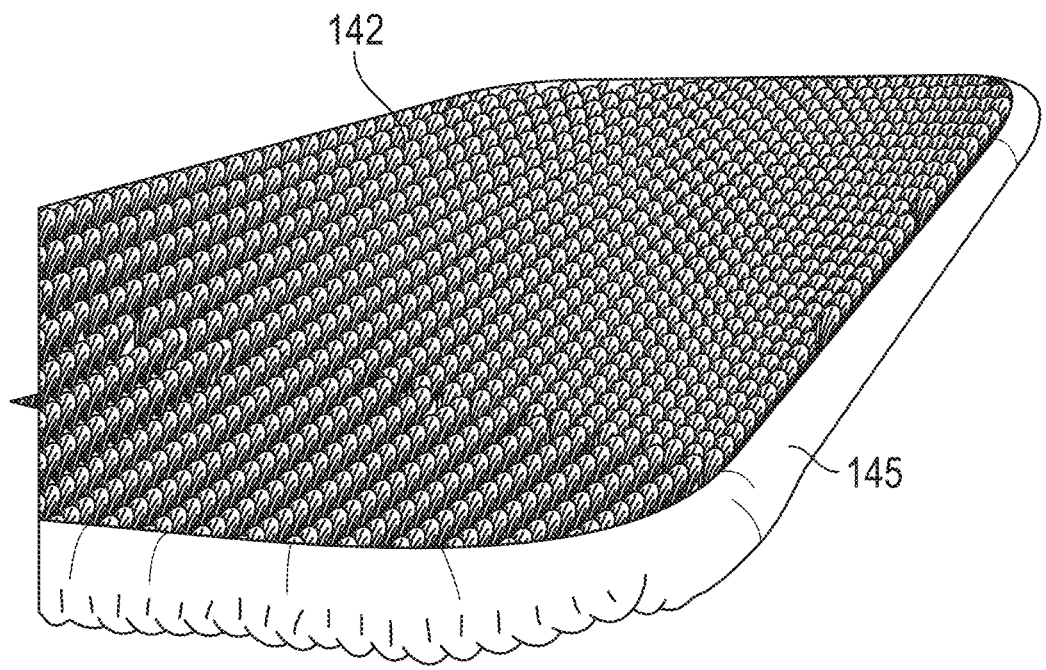
FIG. 4 and FIG. 5 are views of a microfiber mop pad in accordance with an embodiment.
Figure 5:
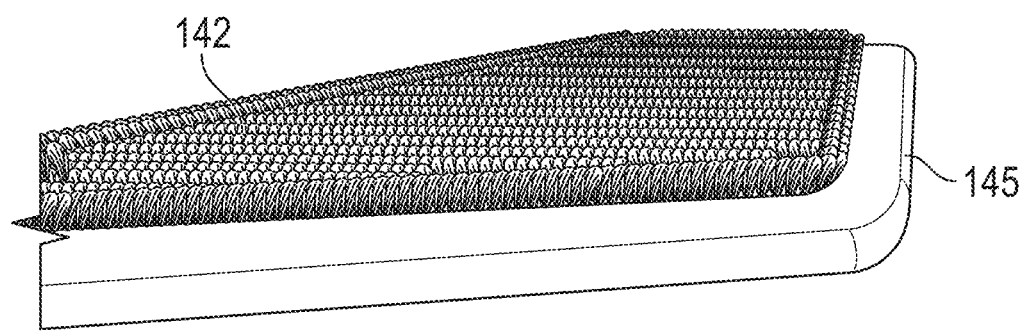
Figure 6:
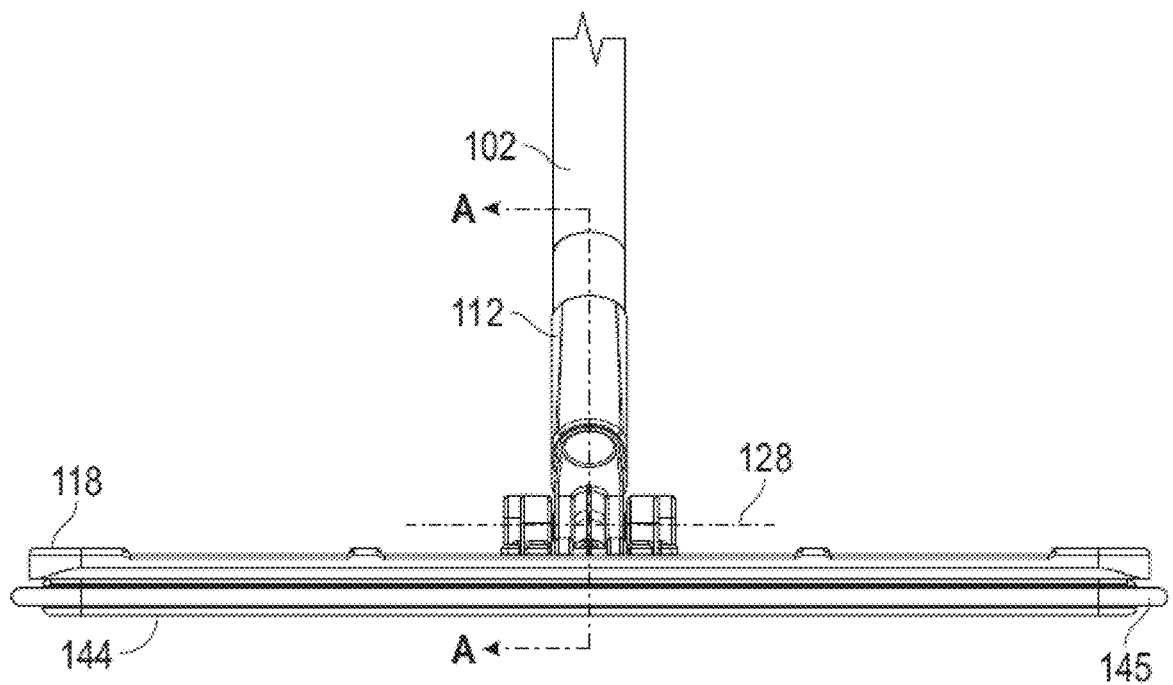
FIG. 6 is a front view of the mop head of the mop assembly of FIG. 1 with the cover removed.
Figure 7:
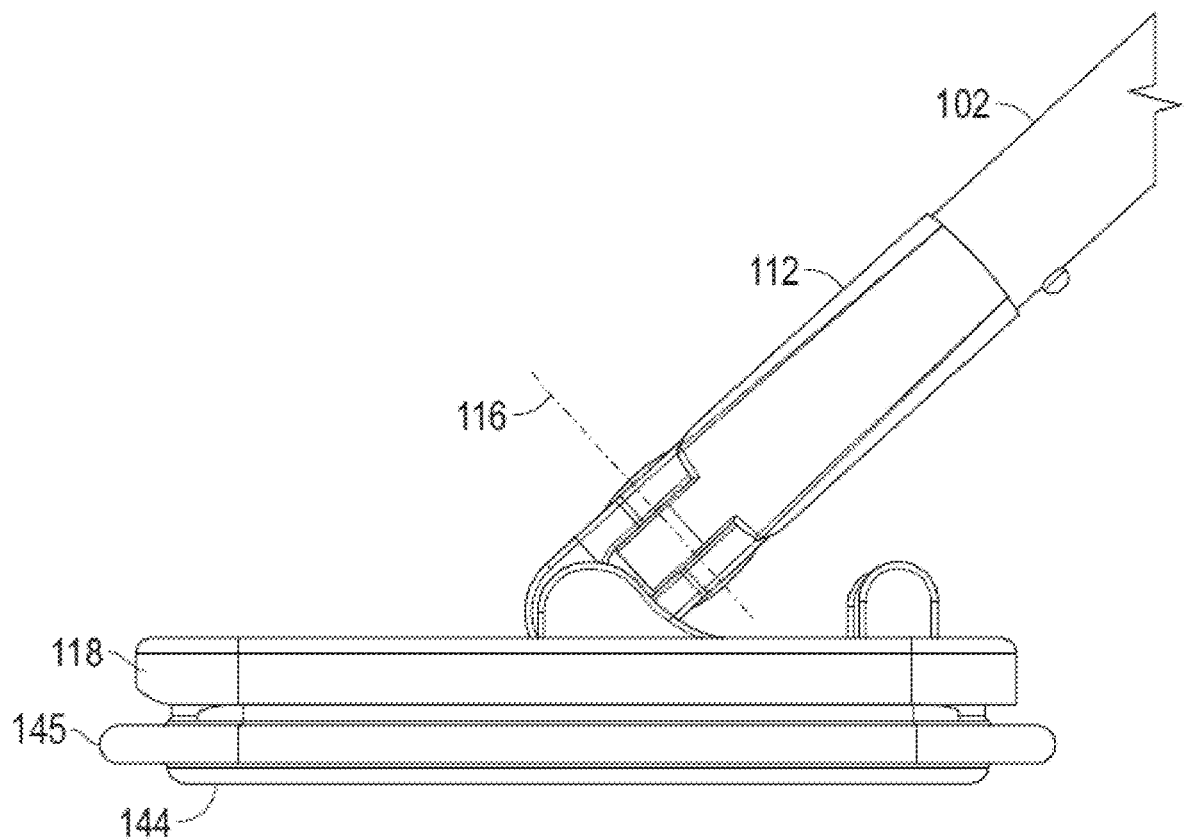
FIG. 7 is a side view of the mop head of the mop assembly of FIG. 1 with the cover removed.
Figure 8:
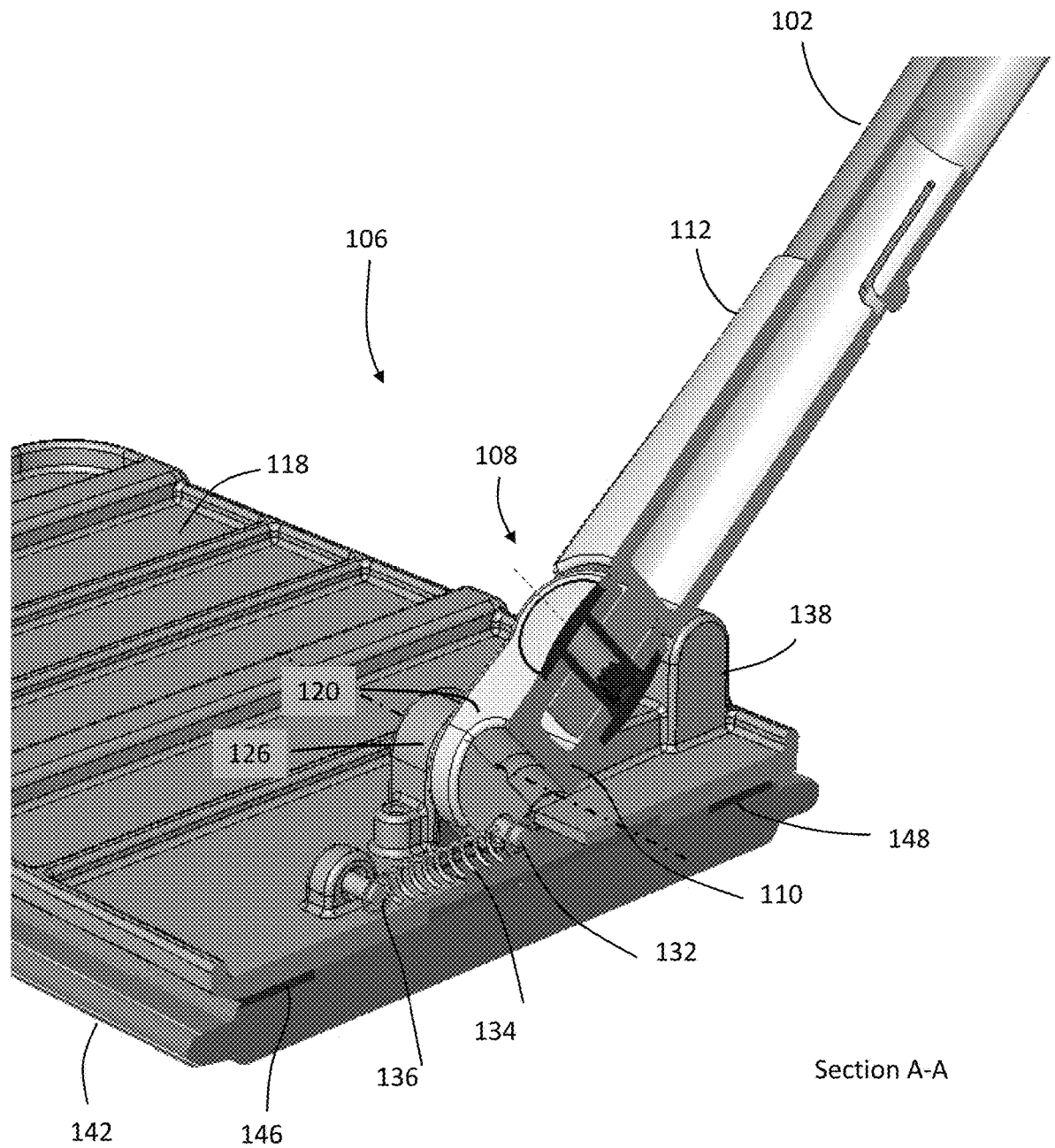
FIG. 8 is a partial perspective sectional view of the mop head and hinge assembly of the mop assembly of FIG. 1 with the cover removed.
Figure 9:
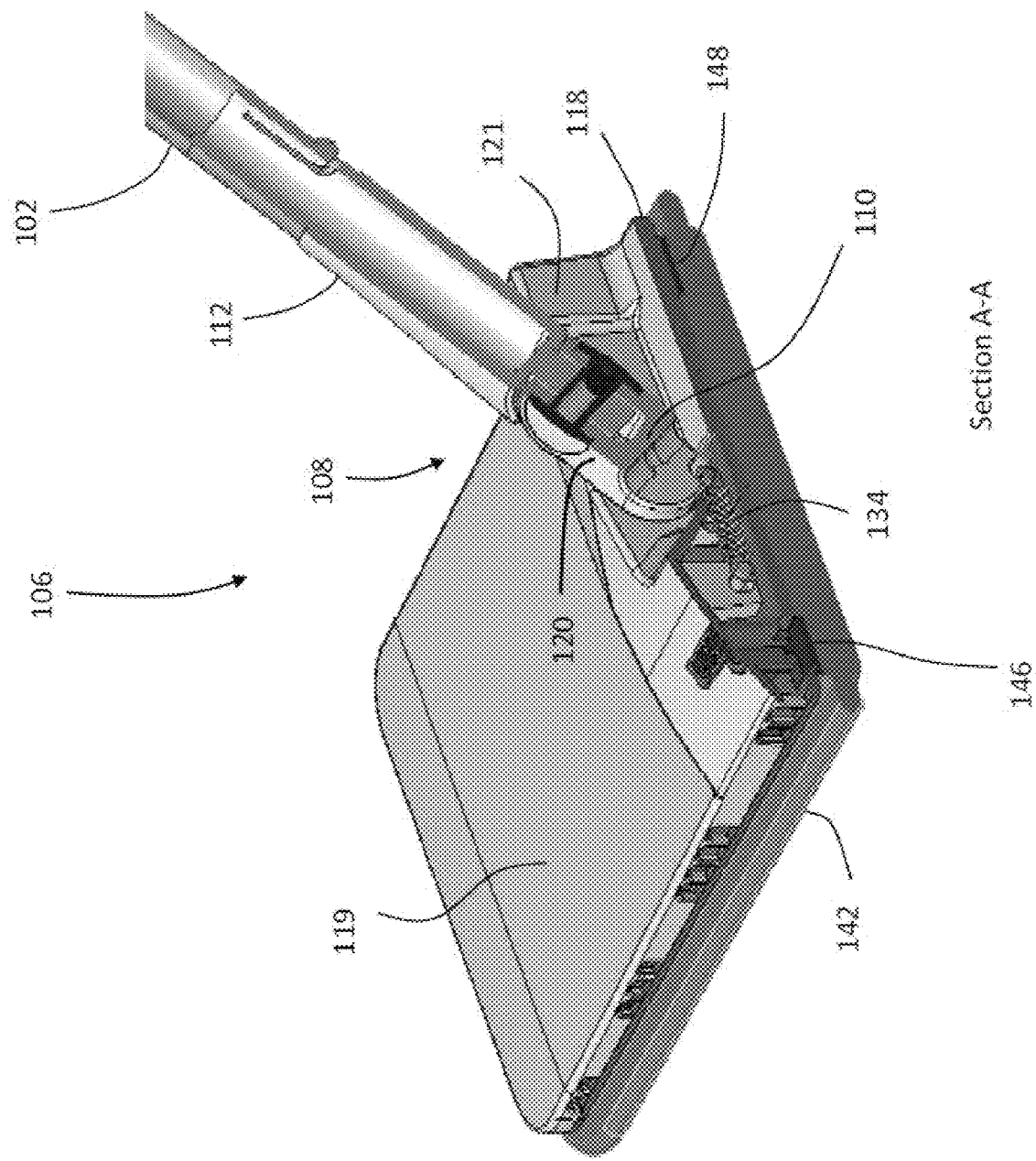
FIG. 9 is a partial perspective sectional view of the mop head and hinge assembly of the mop assembly of FIG. 1.

In an embodiment, the mop pad 144 includes a lead-in portion 145 (FIG. 7) that projects outward from the mop pad 144 around the periphery of the mop pad 144. In the illustrated embodiment, the lead-in portion 145 is formed by the binding and over stitching area of the microfiber material as shown in FIG. 4 and FIG. 5. FIG. 4 illustrates an overlock type lead-in portion, while FIG. 5 illustrates a binding type lead-in portion. In an embodiment, the lead-in portion 145 may have a generally paraboloid shaped cross-section. The lead-in portion 145 may extend past the edge 142 of the plate 118. In this embodiment, the curved surface of the lead-in portion 145 engages the surface 2218 and deflects to protect the edge 142 of the plate 118 and the fasteners 146, 148 (FIG. 14) from catching or engaging edges within the wringing assembly. It should be appreciated that this reduces the risk of the mop pad 144 being peeled or decoupled from the plate 118.

As the mop head 106 is inserted into the wringing assembly, the pole 102 (and/or the adapter 112) may be at least partially disposed within the recess 2109. This allows the mop head 106 to be fully inserted without interference from the pole 102 or adapter 112.

As the mop head 106 continues to be inserted, the mop pad 144 transitions over the lead-in surfaces 2218 to engage the tip 2123 of the blade 2122. In the illustrated embodiment, the tip 2123 provides the largest amount of compression of the mop pad 144. As the mop head 106 is inserted, the top surface of the plate 118 on a side opposite the mop pad 144 engages rollers 2132 (FIG. 18A) that keep the mop pad 144 against the blade 2122. Due to the compression of the mop pad 144, fluid in the mop pad is expressed or wrung from the mop pad 144. This fluid flows through the openings in the lead-in surface 2218 or the blade 2122. The fluid then proceeds to flow along the rear portion of the blade 2122 as indicated by arrow 2160. The mop head 106 continues to be inserted (and extracting fluid from the mop pad) until the edge of the plate 118 contacts the rib portion 2125 (FIG. 17). The rib portion 2125 spaces the mop pad 144 away from the wall below the wringing assembly and spaces the edge of the mop pad 144 way from the wall. As a result, when the extracted fluid flows along the fluid path indicated by arrow 2160, the extracted fluid (which may include dirt or other contaminants) is not reabsorbed into the mop pad 144, keeping the mop pad 144 clean and dry. The extracted fluid flows through rib portion 2125 and into the lower portion of the first compartment 2102. It should be appreciated that this arrangement provides advantages in keeping any dirty or contaminated fluid in the first compartment 2102.

Figure 18B:
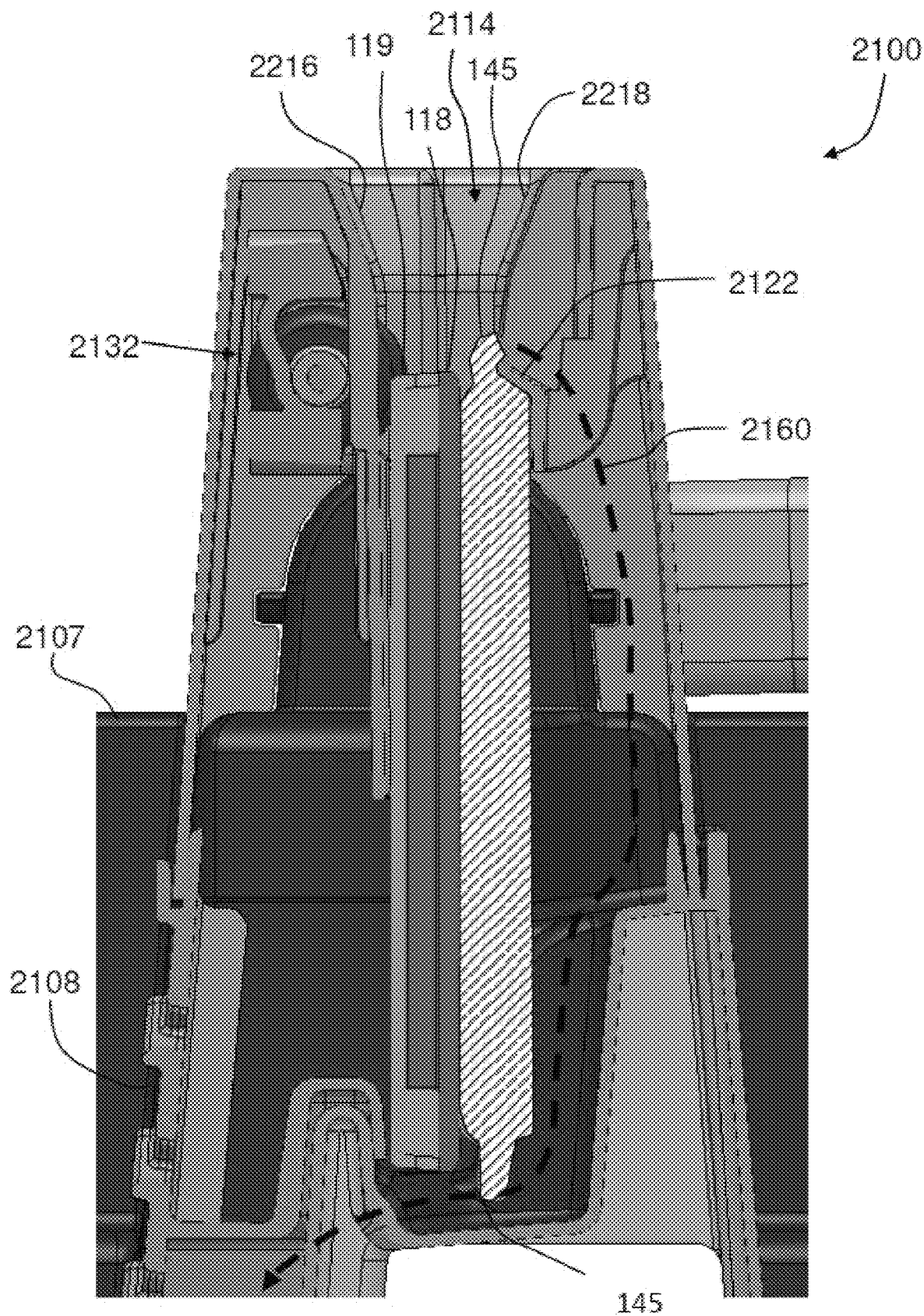
Figure 19:
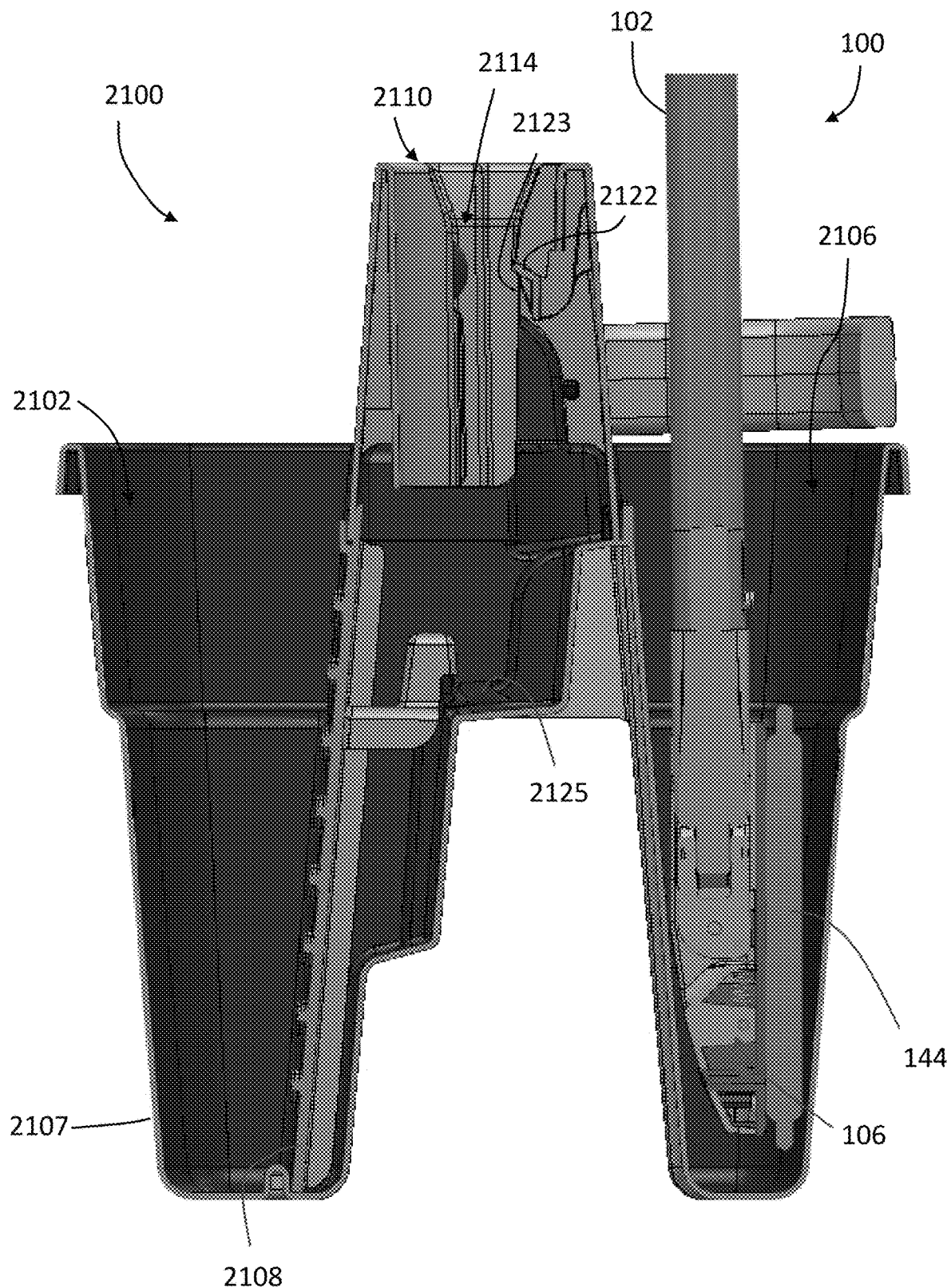
Figure 20:
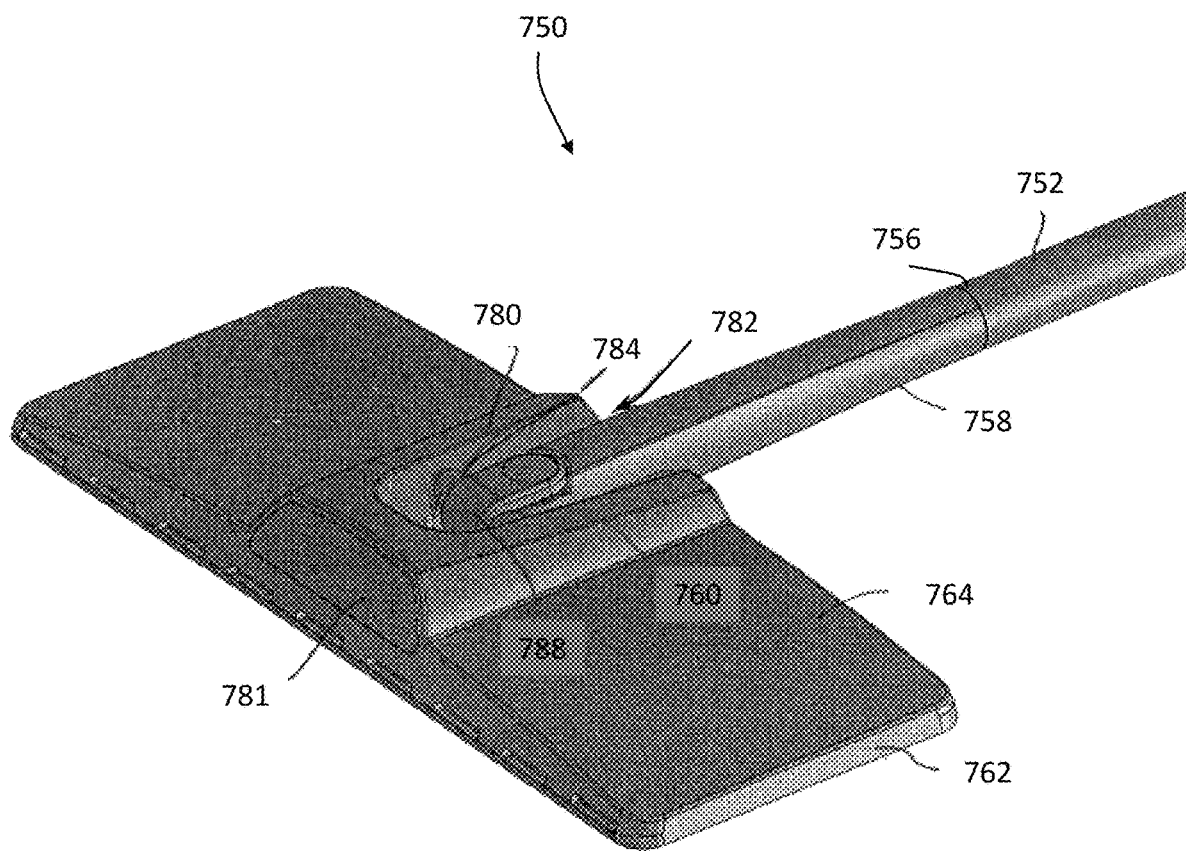
FIG. 20, 21, 22, 23 and FIG. 24 illustrate a mop head of a mop assembly in accordance with another embodiment.

In an embodiment where the mop pad 144 includes a lead-in portion 145, when the mop head 106 is fully inserted into the wringer assembly, the lead-in portion 145 on the side adjacent the pole 102 may overlap the tip 2123 as shown in FIG. 18B and FIG. 19. In this way the lead-in portion is already engaged with the blade 2122 to allow a smooth transition of the mop pad 144 as the mop head 106 is withdrawn from the wringer assembly.

In an embodiment, the plate 118 may include a curved surface 118L (FIG. 12) or the cover 119 may include a curved surface 119L (FIG. 13). The surfaces 118L, 119L are lead-in surfaces for the opposite side of the mop head 106 that provide for a smooth transition of the mop head 106 into the slot 2114 of the wringing assembly 2110.

It should be appreciated that each time the mop head 106 is inserted into the wringer assembly the compression of mop pad 144 causes additional fluid to be extracted from the mop pad 1144. Typically, a mop pad 144 will contain about 5-6 oz (148 ml-177.44 ml) of fluid, with about 5.5 oz (162.7 ml) being desired. In an embodiment, blade is positioned to compress the mop pad to extract about 30%-50% of a fluid in a saturated mop pad when the flat headed mop is inserted into the wringing assembly a first time. In an embodiment, the blade is positioned to compress the mop pad to extract about an additional 10%-30% of the fluid in the saturated mop pad when the flat headed mop is inserted into the wringing assembly a second time. In an embodiment, the blade is positioned to compress the mop pad to extract about and additional 5%-20% of the fluid in the saturated mop pad when the flat headed mop is inserted into the wringing assembly a third time. In an embodiment, the blade is positioned to compress the mop pad to extract about an additional 1%-15% of the fluid in the saturated mop pad when the flat headed mop is inserted into the wringing assembly a fourth time.

In another embodiment, blade is positioned to compress the mop pad to extract about 20%-60% of a fluid in a saturated mop pad when the flat headed mop is inserted into the wringing assembly a first time. In an embodiment, the blade is positioned to compress the mop pad to extract about an additional 2%-30% of the fluid in the saturated mop pad when the flat headed mop is inserted into the wringing assembly a second time. In an embodiment, the blade is positioned to compress the mop pad to extract about and additional >0%-20% of the fluid in the saturated mop pad when the flat headed mop is inserted into the wringing assembly a third time. In an embodiment, the blade is positioned to compress the mop pad to extract about an additional >0%-10% of the fluid in the saturated mop pad when the flat headed mop is inserted into the wringing assembly a fourth time.

After the mop head 106 has been fully inserted, the user then reverses direction of the mop 100 to remove the mop head from the wringing assembly 2110. In an embodiment, as the mop head is withdrawn, the rollers 2132 move from the position shown in FIG. 18A to a second position where the rollers 2132 move a second position further from the blade 2122. It should be appreciated that this reduces the amount of compression on the mop pad 144. It should be appreciated that by reducing the amount of compression on the mop pad 144, the force used to withdraw the mop head 106 from the wringing assembly 2110 is reduced. In some embodiments, the rollers 2132 are fixed and the blade 2122 moves to withdraw into the wringing assembly housing, as a result there is little or no compression of the mop pad 144. It should be appreciated that reducing the withdrawal force provides advantages in making it easier for the user to withdraw the mop 100 and also in reducing or preventing the occurrence of the user lifting the bucket assembly 2100 off of the floor or surface that it is placed.

After withdrawing the mop head 106 from the wringing assembly 2110, the mop head 106 may be placed in the second compartment 2106 (FIG. 19). This rewets or recharges the mop pad 144 with the desired cleaning solution. The user may the either repeat the insertion of the mop head 106 into the wringing assembly 2110 to reduce the amount of fluid in the mop pad 144 (such as may be desired for wood floors for example), or immediately proceed to cleaning the surface.

Figure 21:
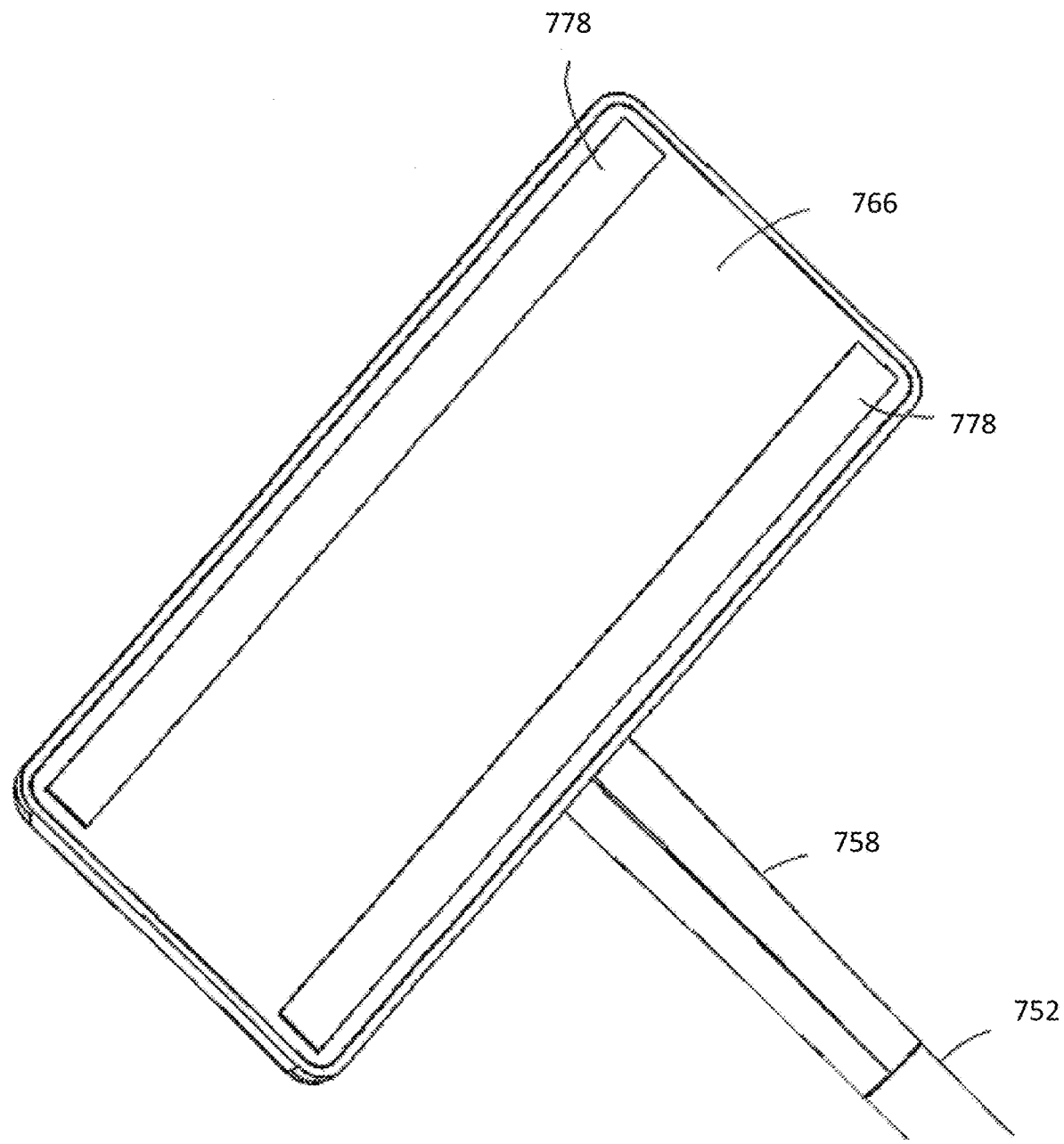
Figure 22:
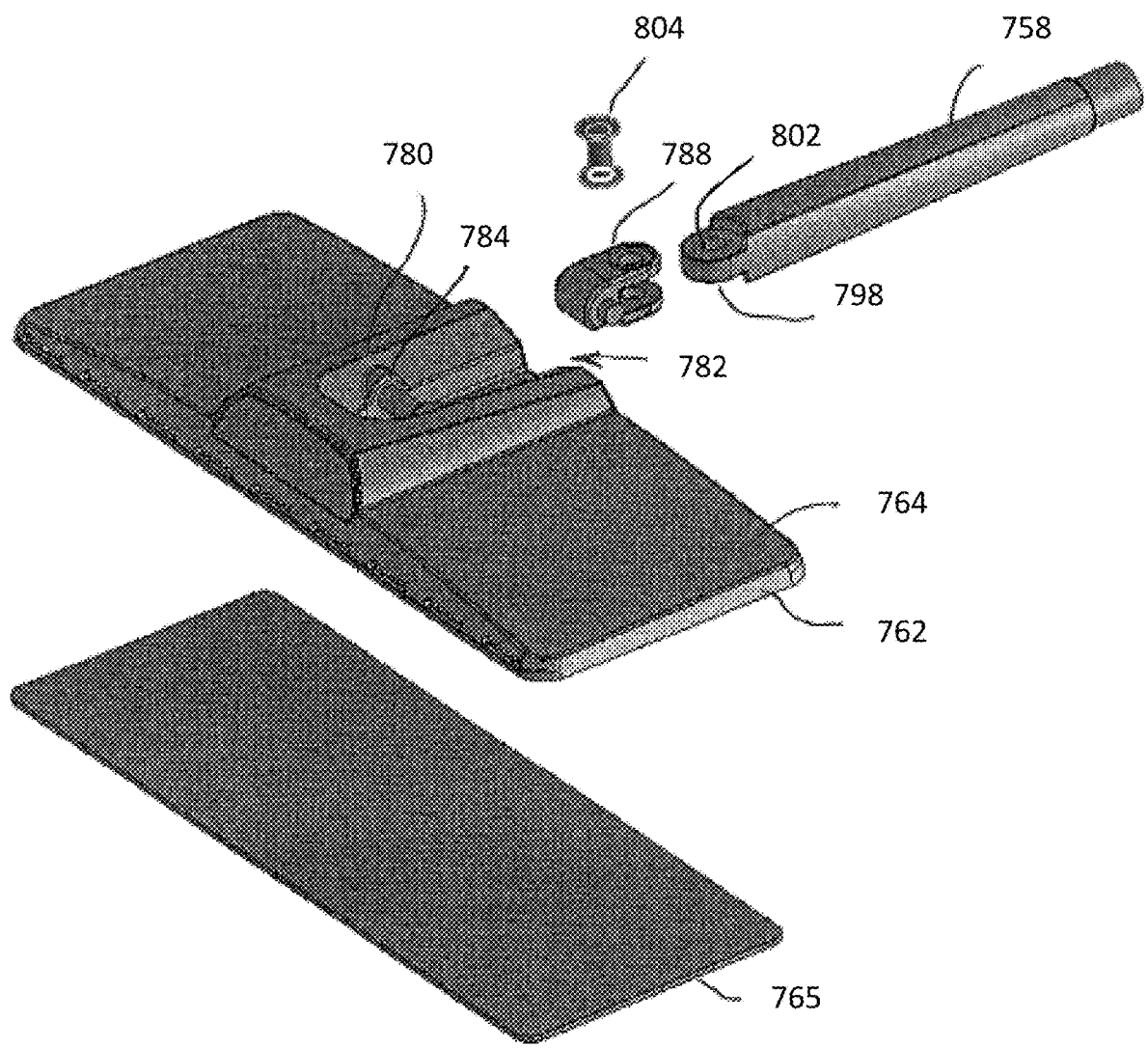
Figure 23:
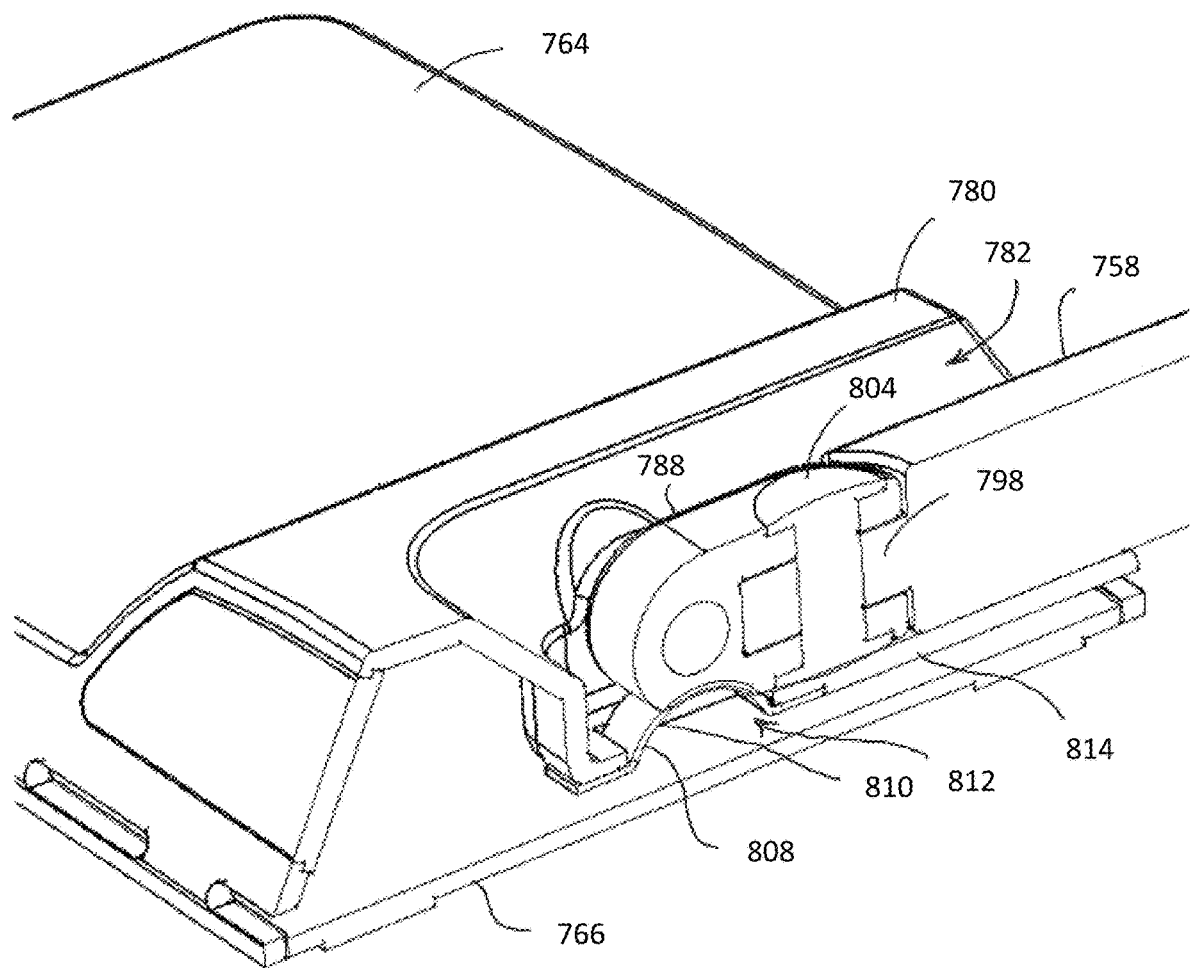

Referring now to FIGS. 20-24, an embodiment is shown of a floor cleaning tool or a mop 750. The mop 750 includes a pole 752 that is comprised of an elongated member, such as a cylinder for example. The pole 752 may have a handle on one end. An opposite end 756 is coupled to an adapter 758 that couples the pole 752 and forms part of a hinge assembly 760. The hinge assembly 760 couples the mop head 762 to the pole 752. In an embodiment, the mop head 762 includes a first or top surface 764 and a second or bottom surface 766 (FIG. 21). The bottom surface 766 may include a fastening attachment 778, such as a hook and loop type fastener for example, that couples the mop pad 765 to the mop head 762. When used with the bucket assembly 2100 of FIG. 16, the rollers 2132 engage the top surface 764.

Figure 24:
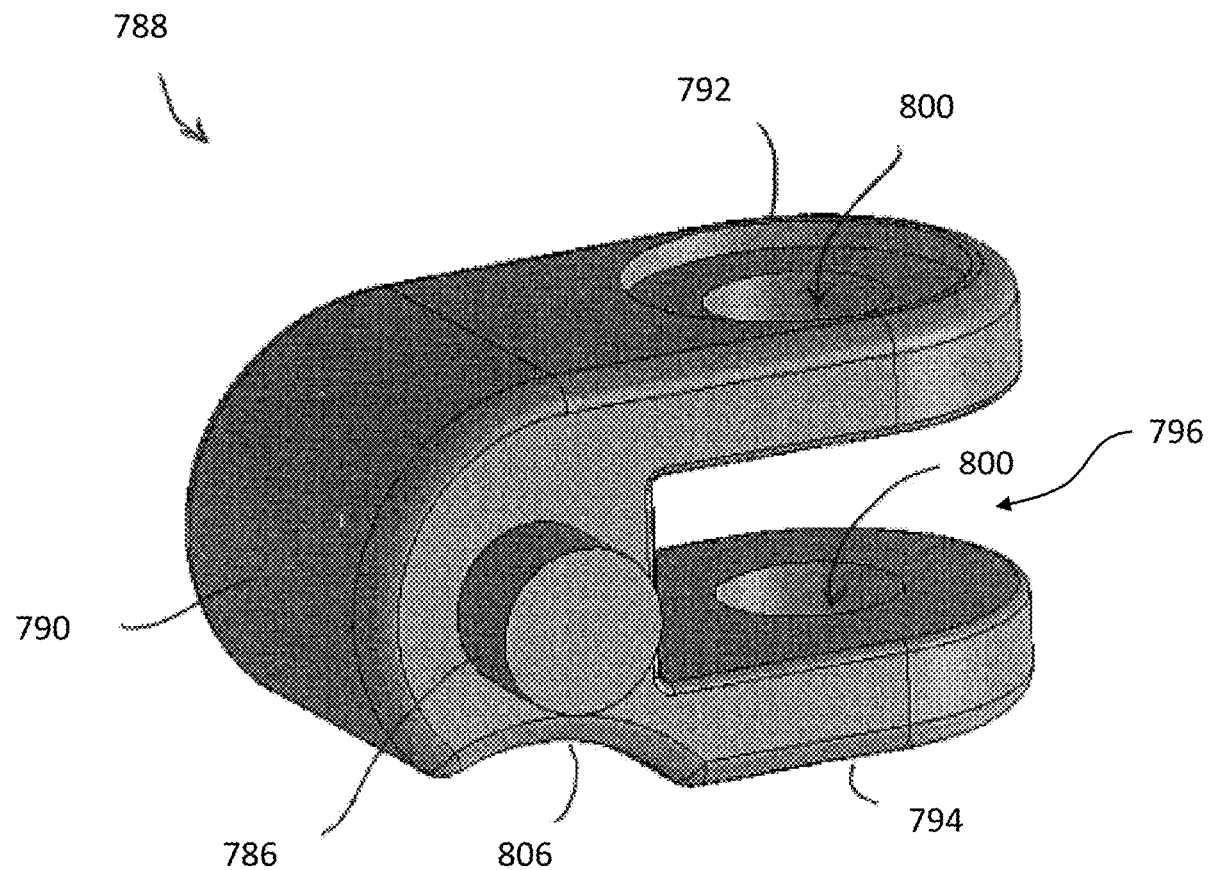
Figure 25:
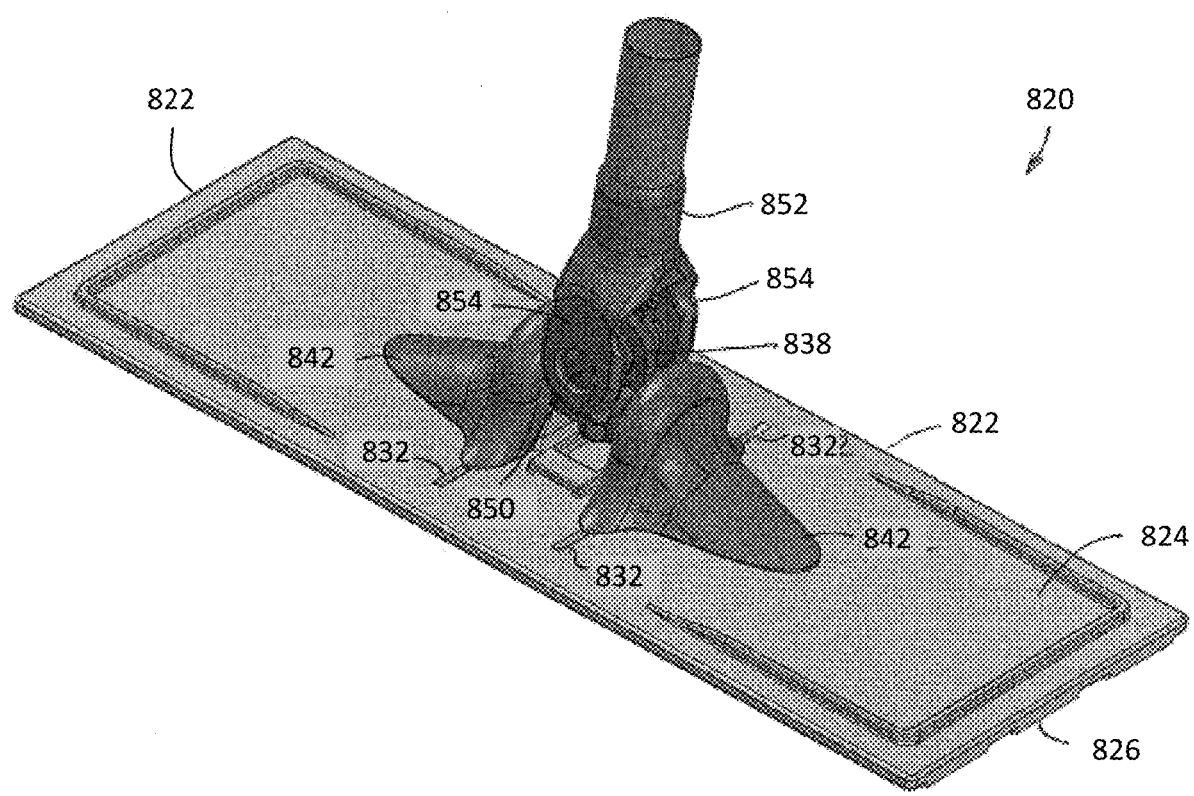
FIG. 25, 26, 27 and FIG. 28 illustrate a mop head for a mop assembly in accordance with another embodiment.
Figure 26:
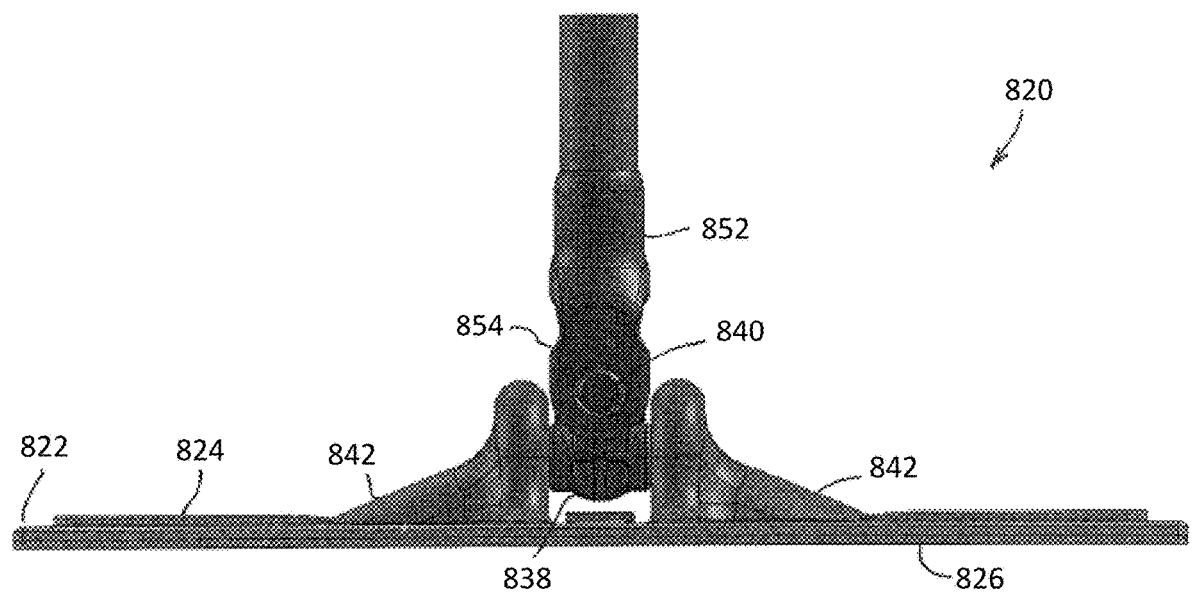
Figure 27:
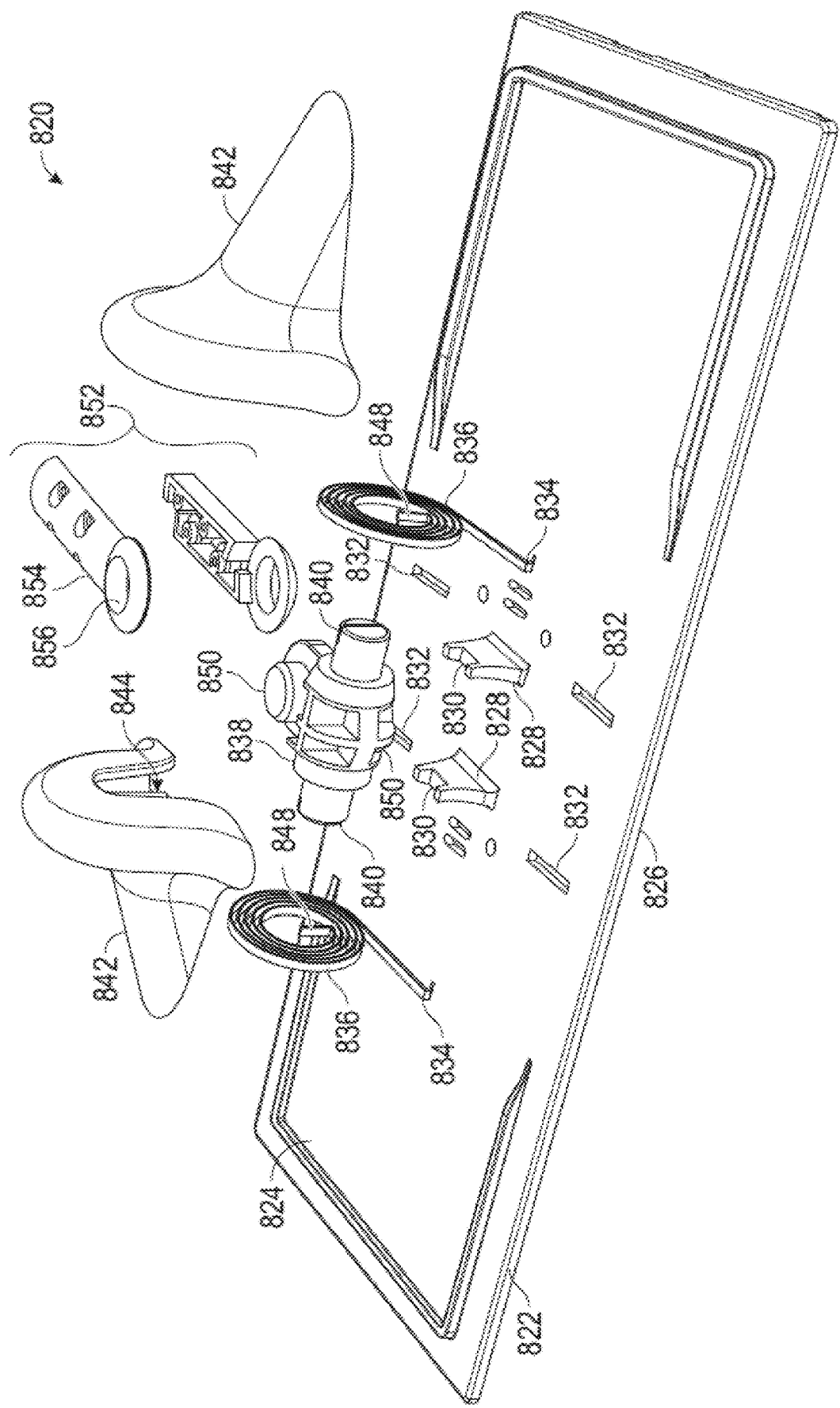
Figure 28:
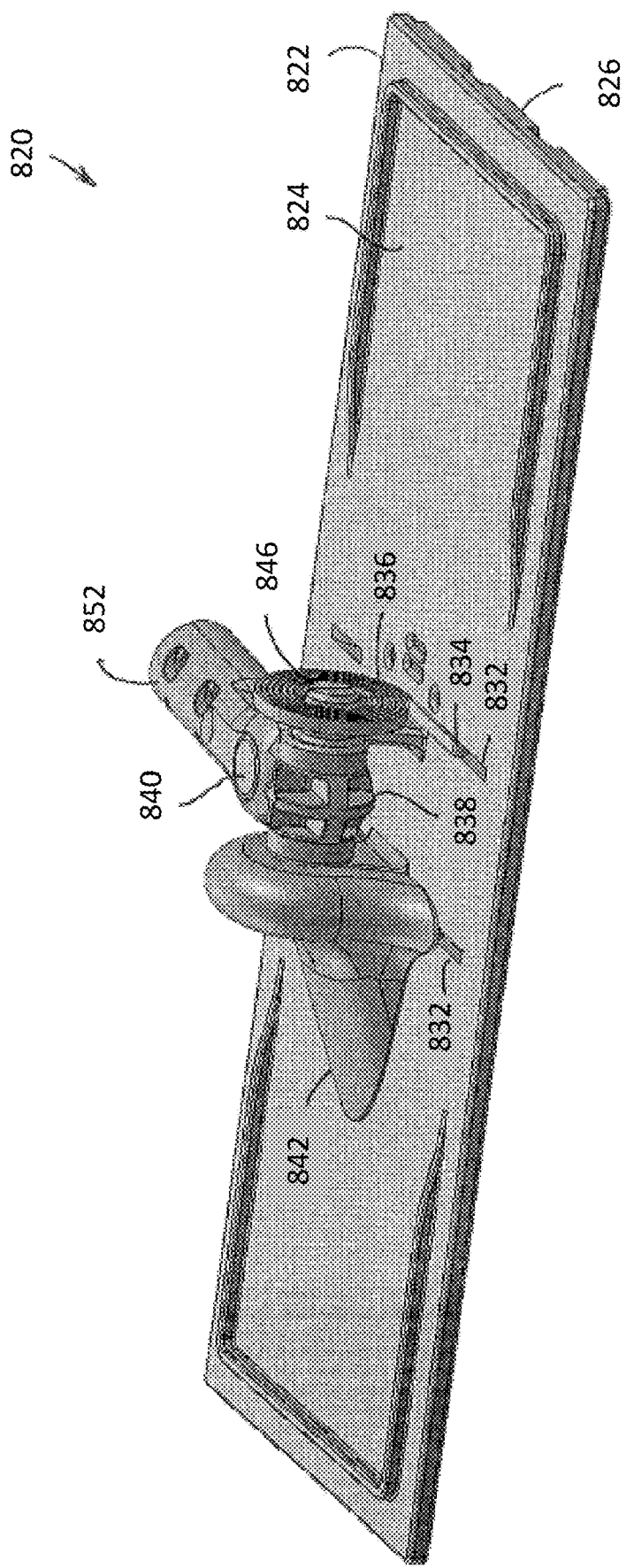
Figure 29:
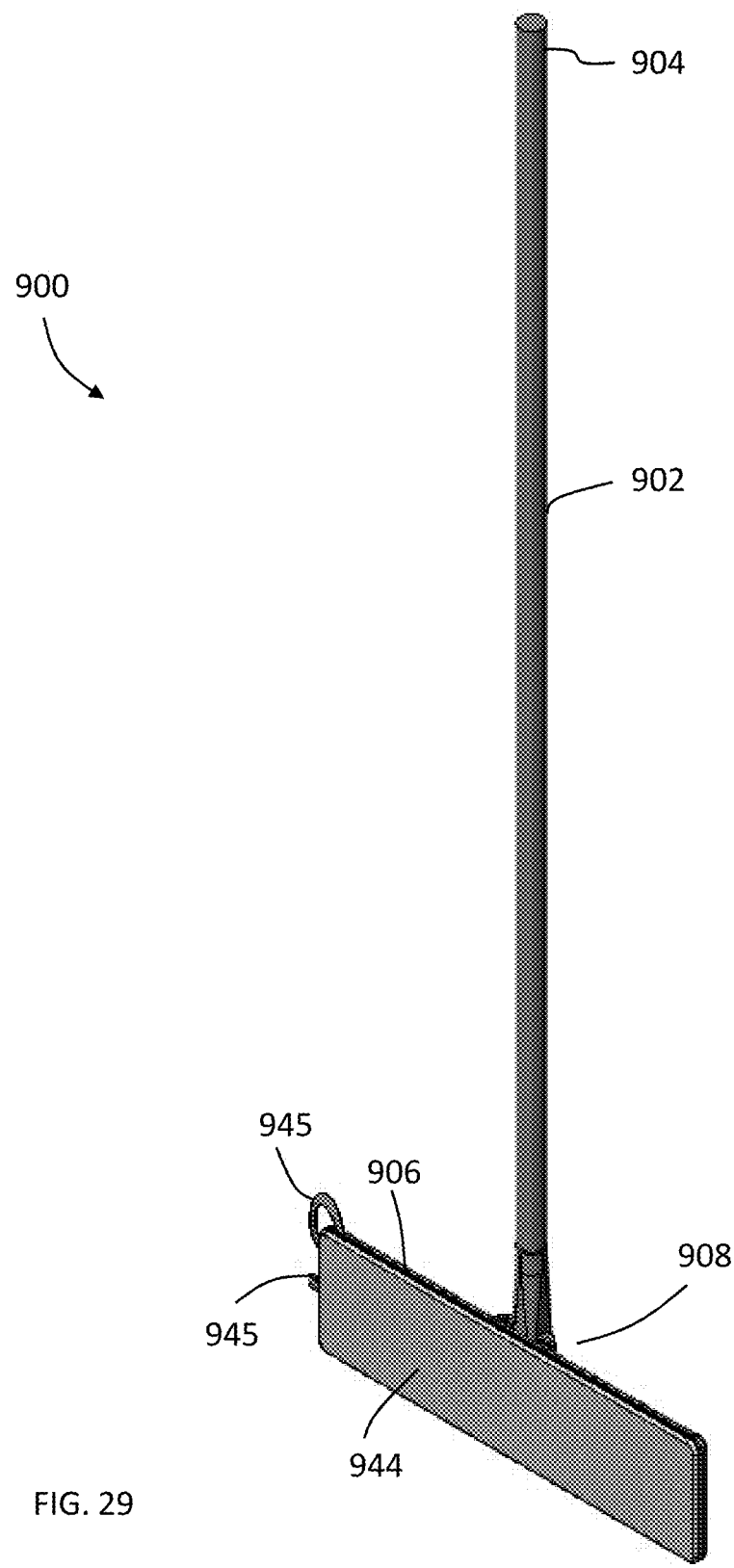
FIG. 29, 30, 31, 32, 33, 34, 35, 36 and FIG. 37 illustrate various views of a flat headed mop assembly in accordance with another embodiment.
Figure 30:
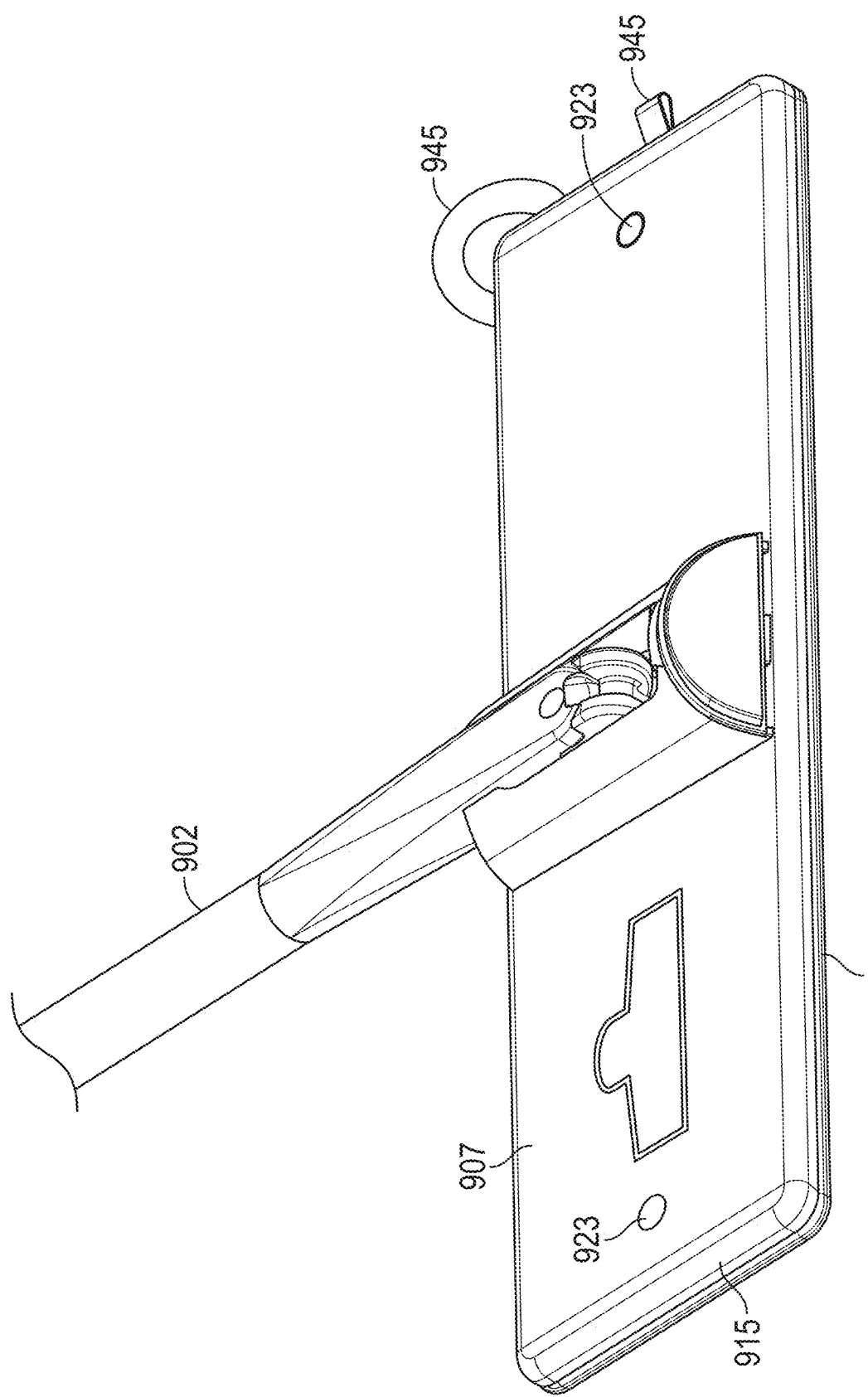
Figure 31:
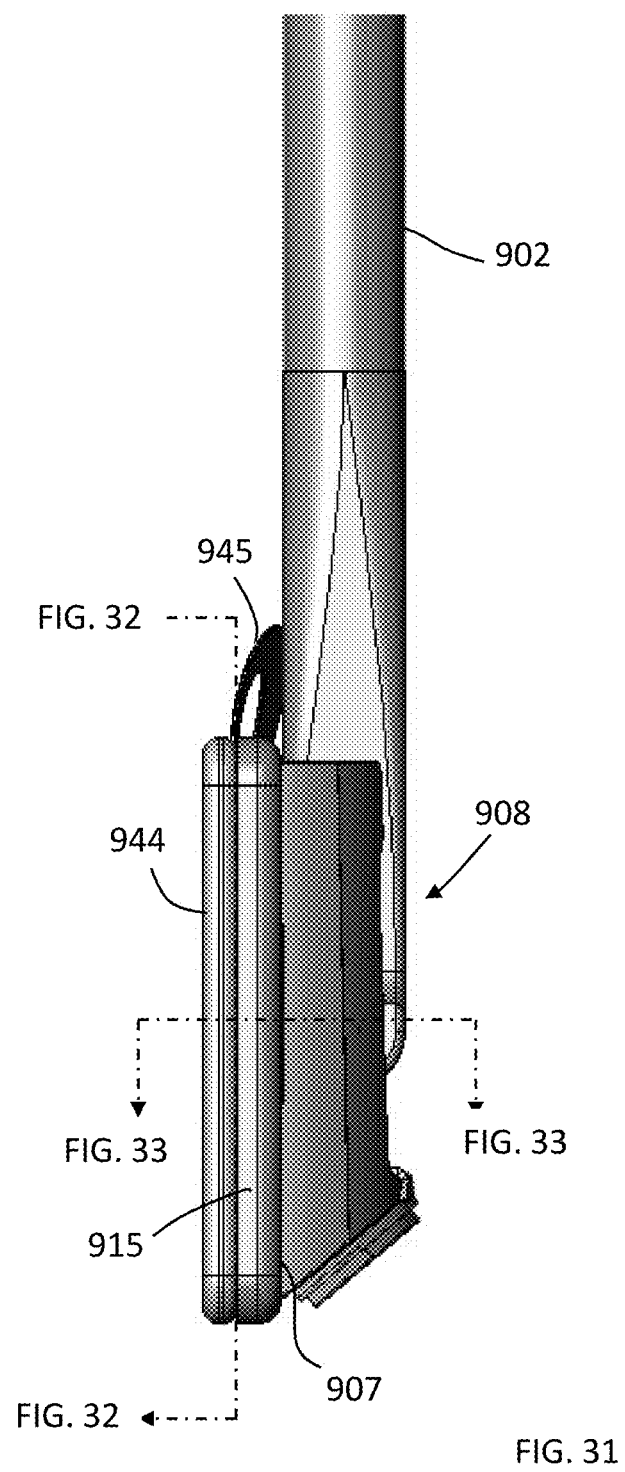
Figure 32:
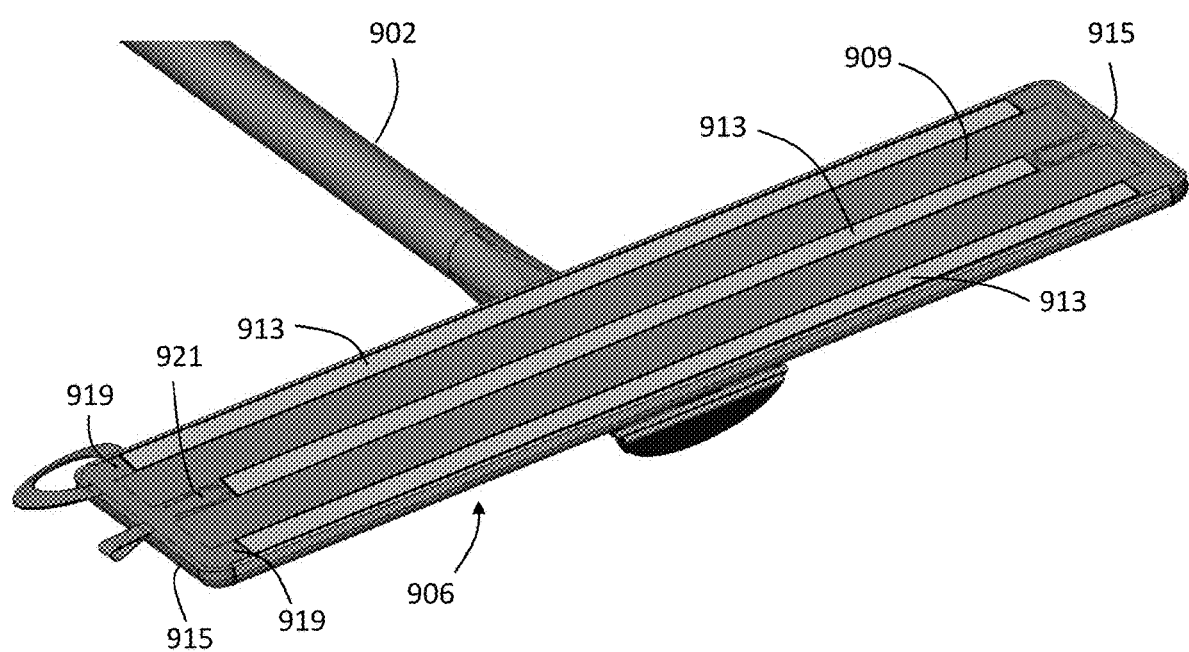
Figure 33:
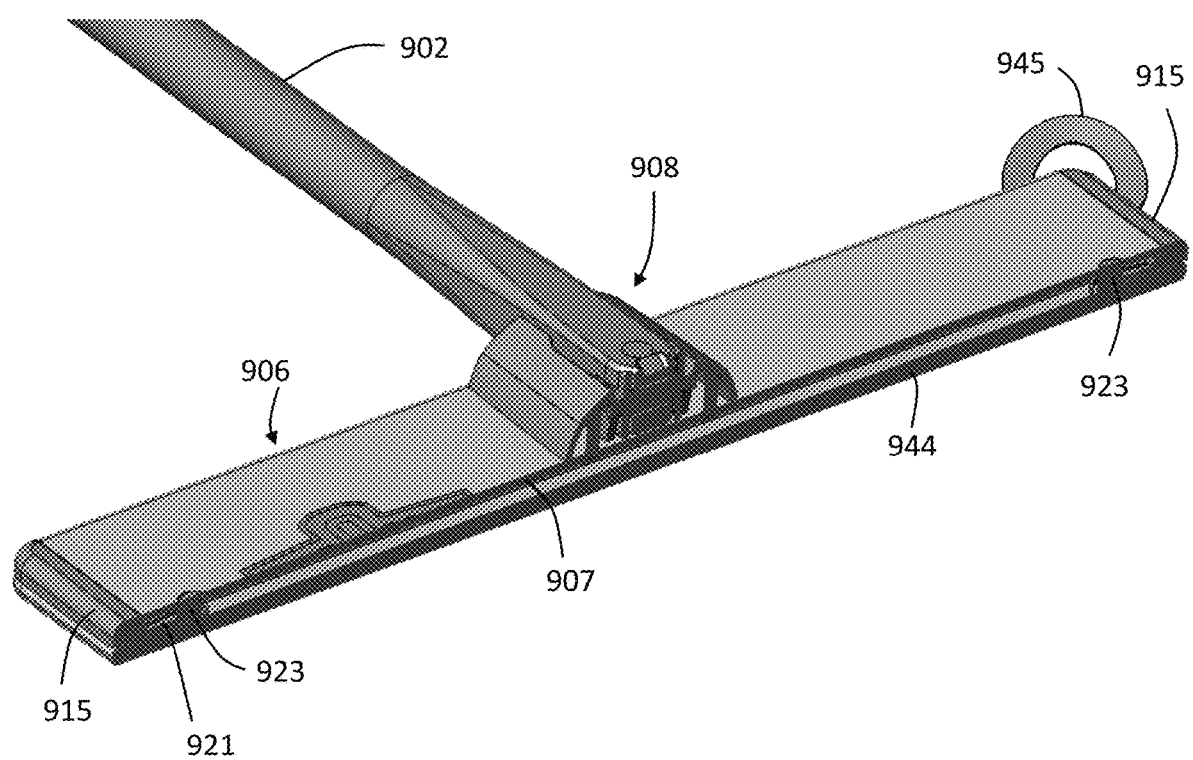

In the illustrated embodiment, the top surface 764 includes a raised portion 780 having a slot 782 and a pair of opposing bosses 784. In an embodiment, the raised portion 780 may include an area 781 for an abrasive or scrubbing material. The bosses 784 each include an opening sized to receive pins 786 of clevis 788. The clevis 788 is sized to fit within the slot 782 and rotate about an axis defined by the pins 786 (FIG. 24). It should be appreciated that while only one pin 786 is shown, those skilled in the art will appreciate there is a corresponding opposing pin on the opposite side of the clevis 788. The clevis 788 includes a semi-cylindrical body portion 790 with a pair of arms 792, 794 extending from one side. The pins 786 extend from the sides of the body portion 790. The arms 792, 794 define a slot 796 therebetween. The end 798 (FIG. 22) of the adapter 758 is sized to be received in the slot 796. Holes 800 in the arms 792, 794 align with a hole 802 (FIG. 22) in the end 798. The clevis 788 is coupled to the adapter 758 by a pin 804 that allows the clevis 788 and pole 752 to rotate relative to each other about an axis defined by the pin 804.

The body portion 790 further includes a semi-circular recess 806 that extends along one side. The recess 806 is sized to receive a locking member 808 that is coupled within the interior surface of the slot 782. In the illustrated embodiment, the locking member 808 is formed from a thin metallic material. In operation, when the mop head 762 is rotated to the vertical position (the position illustrated in FIG. 1), the locking member 808 compresses or deforms, allowing the clevis 788 to be rotated to the vertical position (or rather rotated through a range of angles >zero degrees during operation). When in the vertical position, the lobe or semi-circular portion 810 of the locking member 808 moves back (uncompressed) to its original shape that engages the recess 806 to hold the mop head 762 in the desired position. By applying force to the mop head 762, the clevis 788 may be rotated back by deforming the locking member 808 once again until the body portion 790 is no longer contacting the locking member 808. When the mop head 762 is in the operating (near horizontal) position, the body 790 will remain at least partially in contact with the locking member 808.

In the illustrated embodiment, the locking member is coupled to an interior surface of the top member 764 and the semi-circular portion 810 extends through a slot 812 (FIG. 23) on the bottom surface 814 of the slot 782. It should be appreciated that the locking member 808 holds the mop head 762 with sufficient force to hold the mop head 762 in the vertical position while inserting the mop head 792 into the bucket assembly, such as bucket assembly 2100 for example.

Referring now to FIGS. 25-28, an embodiment is shown of another mop head and hinge assembly 820 for a floor cleaning tool or mop. The assembly 820 includes a mop head 822 having a first side 824 and a second side 826. The second side 826 may include fastening members, such as hook and loop fasteners for example, for attaching the mop pad to the mop head 822. The first or top side 824 includes a pair of standoffs 828 (FIG. 27), each having a semi-circular recess 830 formed on an end opposite the first side 824. The first side 824 further includes a pair of slots 832 that are aligned to receive an end 834 of torsion springs 836. In the illustrated embodiment, the first side 824 includes two pairs of slots 832 to allow the mop head 822 to be assembled in either orientation.

A gimbal 838 having a pair of opposing pins 840 that rest in the recesses 830. The pins 840 are captured for rotation on the recesses 830 by cover members 842. In the illustrated embodiment, the cover members 842 include a slot 844 sized to receive the pins 840. The slot 844 includes an end 846 that constrains translational movement of the pins 840, such that the gimbal 838 rotates about an axis defined by the pins 840. The pins 840 further include a slot 846 (FIG. 28) that receives a second end 848 of the torsion spring 836. In an embodiment, the torsion springs 836 are disposed between the cover members 842 and the top side 824. In operation, the torsion springs 836 bias the mop head 822 so as to cause one edge (i.e. the edge closest to the end 834) of the mop head 822 to rotate upward (e.g. towards the pole) to make the second side 826 parallel with the axis of the pole.

The gimbal 838 further includes a second pair of pins 850. The axis defined by the pins 850 is perpendicular to the axis defined by the pins 840. In the illustrated embodiment, the axis defined by the pins 850 is offset from the axis defined by the pins 840. A clevis 852 includes arm portions 854 having holes 856 that receive the pins 850 to rotationally couple the clevis 852 to the gimbal 838. It should be appreciated that the gimbal 838 allows the mop head 822 to be rotated between an operating position and a vertical position (e.g. a position where the assembly 820 may be inserted into a bucket assembly, such as bucket assembly 600). It should further be appreciated that the biasing of the torsion springs 836 biases the mop head 822 to a vertical position when the user lifts the mop head 822 off of the working surface such as the floor.

Referring now to FIG. 29-33, another embodiment is shown of a flat headed mop assembly 900. In an embodiment, the mop 900 includes a pole 902 having a gripping end 904 and a mop head 906. The mop head 906 is coupled to the pole 902 by a hinge assembly 908. The hinge assembly 908 may be the same as hinge assembly 108 and is configured to bias the mop head 906 towards the vertical position as shown.

In this embodiment, the mop head 106 includes a body 907 having a planar surface 909. The body 907 includes a plurality of channels 911 that extend along the length of the mop head 906. Received within these channels is a first portion 913 of a hook and loop fastener. In the illustrated embodiment, the first portion 913 includes either the hook portion or the loop portion of the hook and loop fastener. In an embodiment, the first portion 913 includes the hook portion sewn to a plastic strip, which is then slid into the channel 911. In an embodiment, the plastic strip may be coupled to an extrusion that is slid into the channel 911.

To capture the first portions 913 in the channels 911, an end cap member 915 is provided. The end cap 915 includes a body 917 having a pair of outer protrusions 919 that are sized to fit in the outer channels 915. The end cap 915 further includes a center protrusion 921 that fits into the center channel 911. In an embodiment, the center protrusion 921 includes a pin 923 that is captured in an opening in the body 907. The pin may extend from a flexible portion 924 that allows the pin 923 to snap into the opening in the body 907.

In this embodiment, the mop pad 944 includes the other corresponding half of the hook and loop fastener that allows the mop pad 944 to be coupled to the body 907 via the first portions 913. In an embodiment, the mop pad 944 may include tabs 945 that facilitate the removal of the mop pad 944 by the user.

Figure 34:
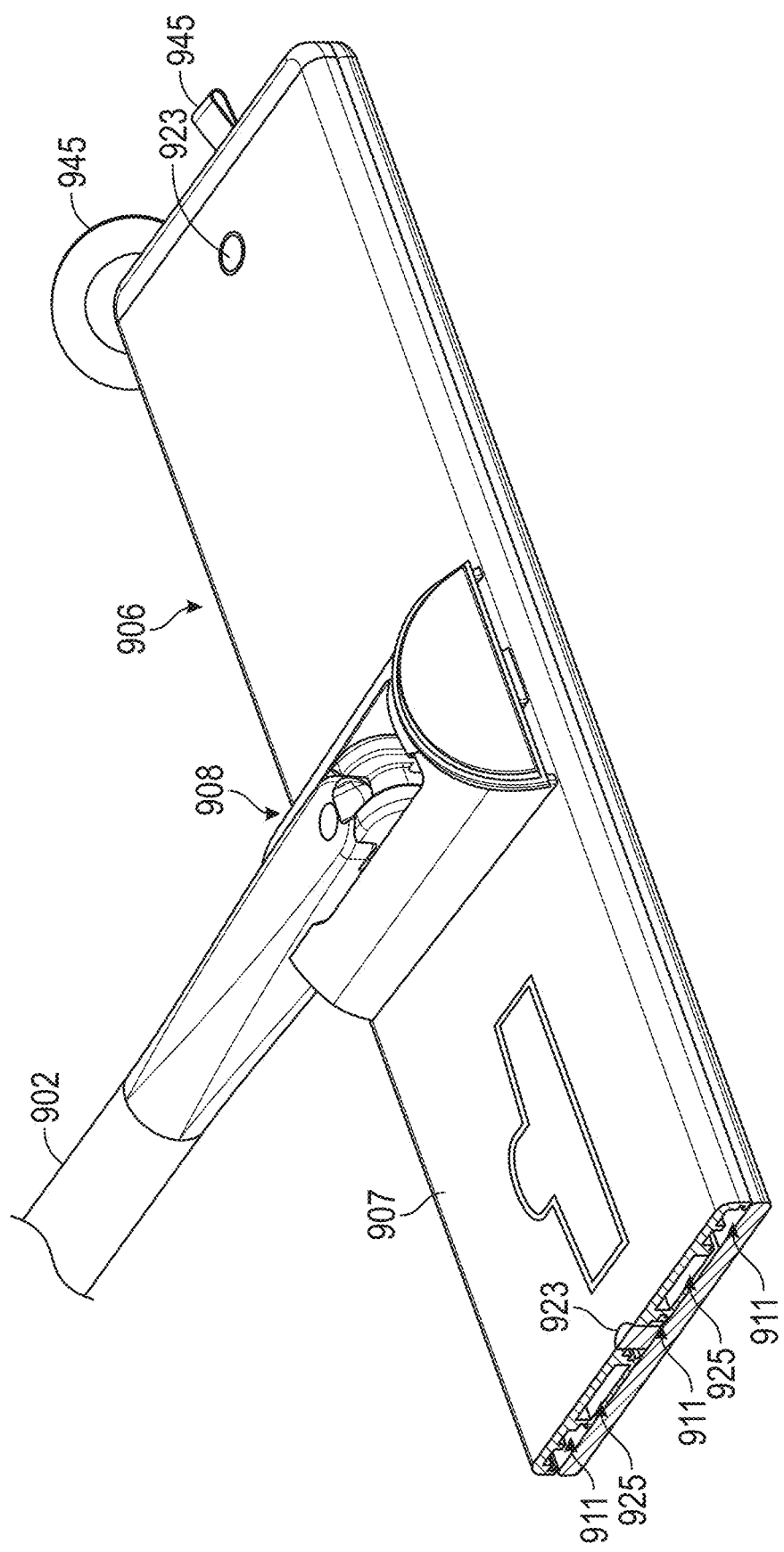
Figure 35:
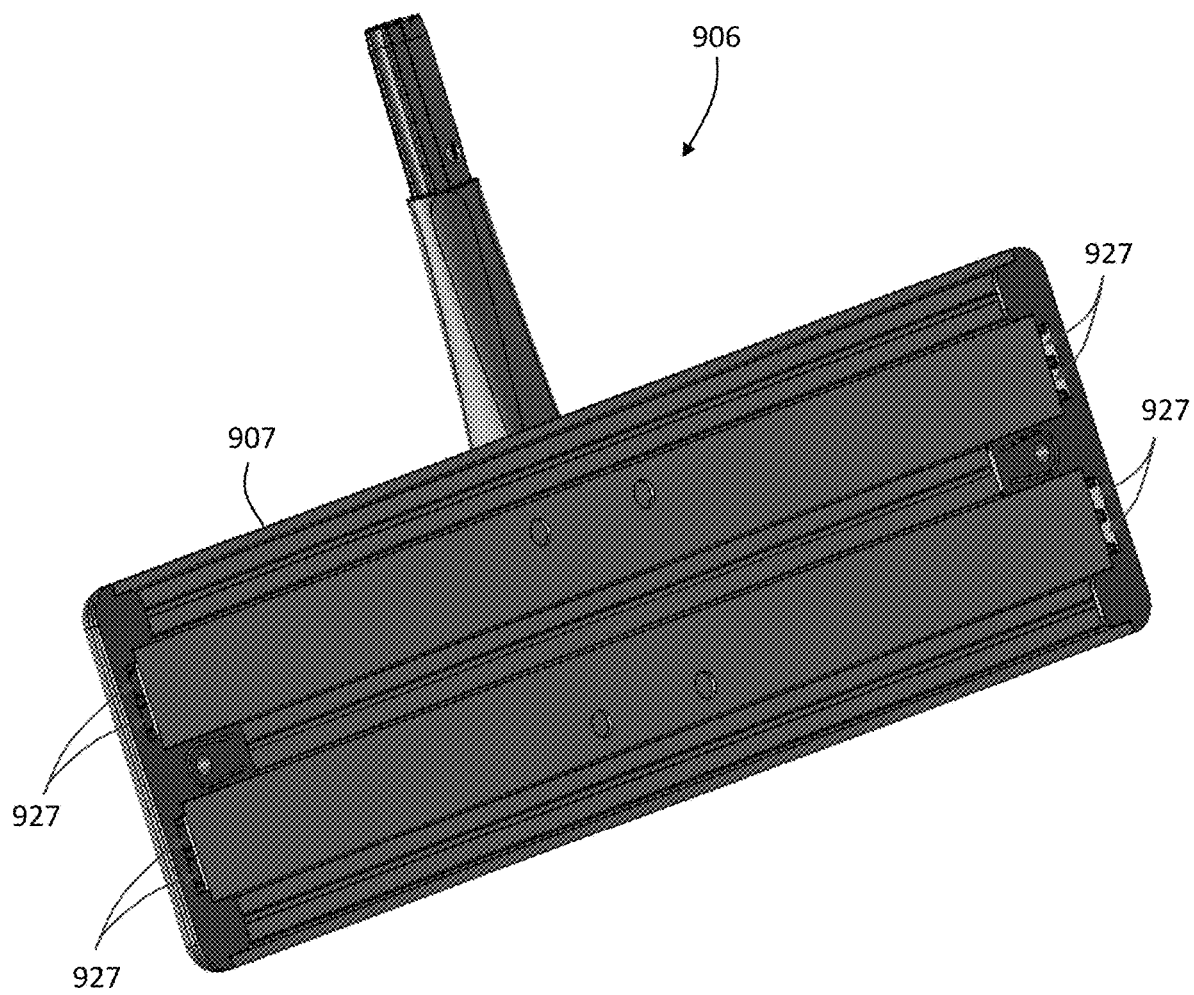
Figure 36:
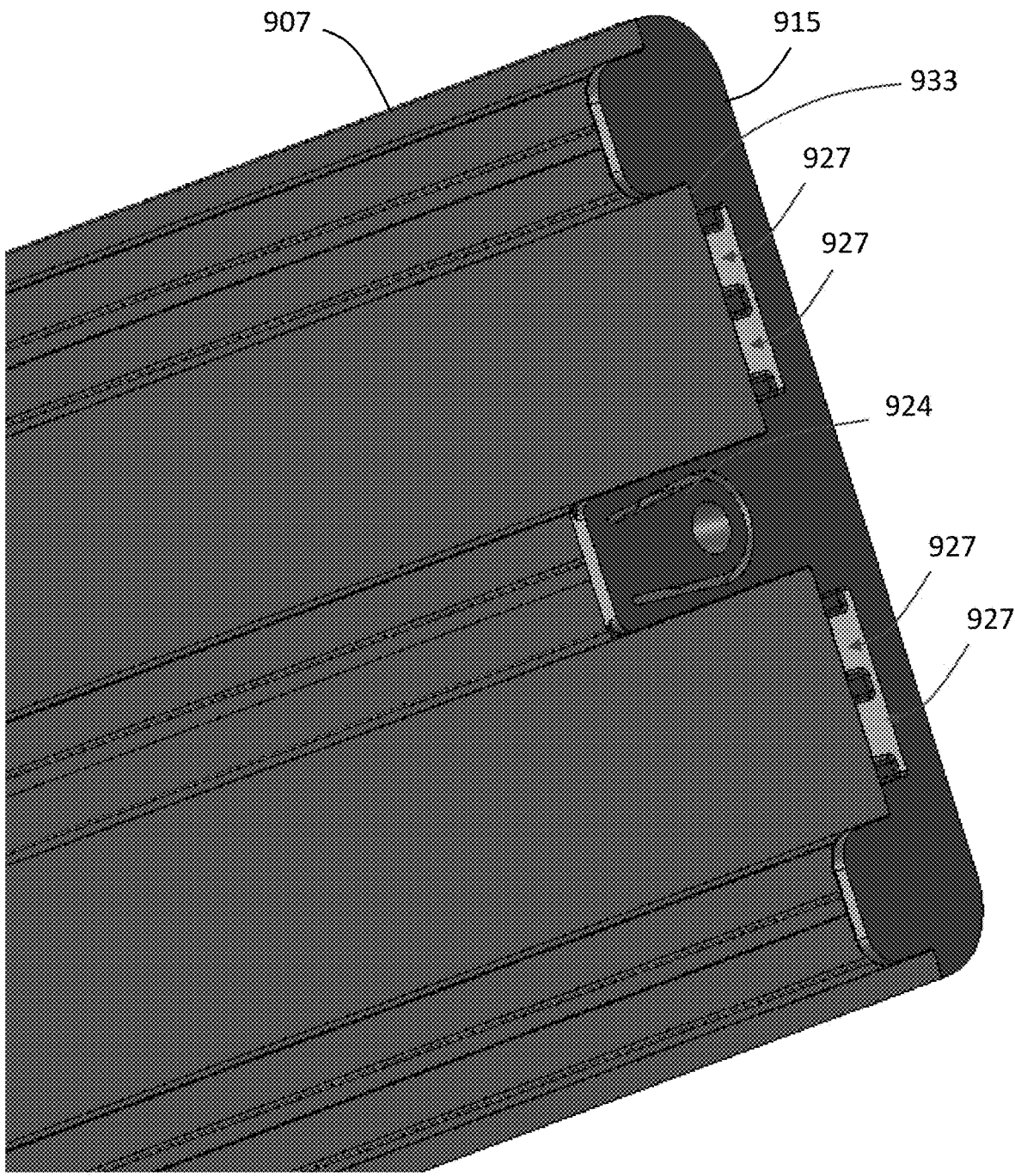

In an embodiment, the body 907 also includes one or more channels 925 (FIG. 34) that extend along the length of the body 907. In an embodiment, the body 907 is formed as an extrusion, such as an aluminum extrusion for example. The channels 925 make the body 907 less costly, lower weight, and easier to manufacture. However, when the mop head 906 is immersed in a fluid, the channels 925 may become filled with fluid. It should be appreciated that unless the fluid is removed, the mop pad may not have the desired level of fluid after wringing since the fluid in the mop pad will infiltrate the mop pad during use.

Figure 37:
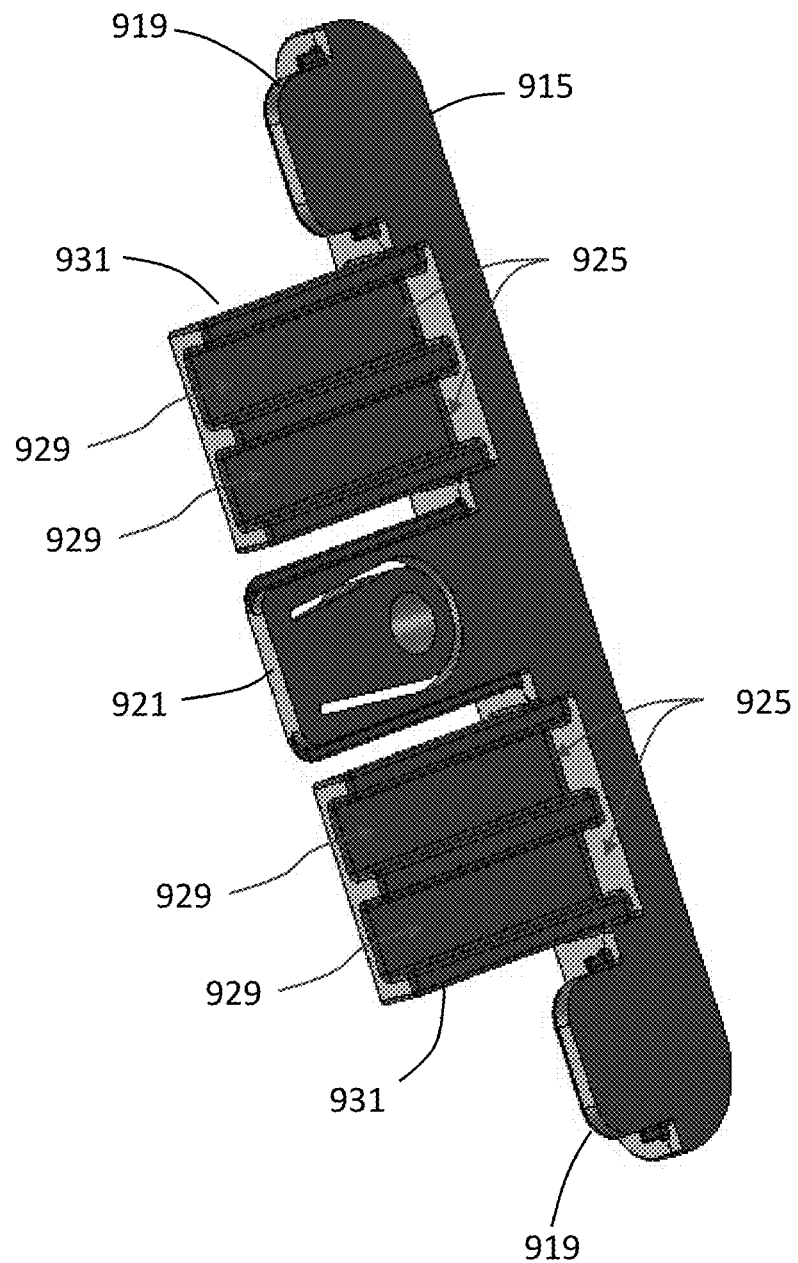

In an embodiment, the channels 925 fluidly communicate with flow ports 927 in the end cap 915. In an embodiment, the flow ports 927 may be defined by slots 929 (FIG. 37) formed in a projection 931. The projections 931 are sized and positioned to fit within the channels 925. The slots 929 extend beyond the edge 933 of the body 907. As a result, an opening that defines the flow port 927 is formed between the edge 933 and the end of the slots 929. The flow ports 927 provide a flow path from the channels 925 to the edge of the mop pad. Therefore, when the mop pad is wrung in the wringing assembly, the fluid within the channels 925 will flow out the flow ports 927 to the edge of the mop pad and away from the mop head. In this way, the user can achieve the desired level of fluid in the mop pad without additional fluid being trapped within the mop head.

Advantageously, embodiments described herein provide for a flat headed mop that may be used to clean surfaces, such as floors. The mop is configured with a mop head and hinge assembly that automatically rotates the mop head into a folded or vertical position allowing it to be inserted into a bucket or wringer without additional effort or steps by the user.

The term "about" is intended to include the degree of error associated with measurement of the particular quantity based upon the equipment available at the time of filing the application.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of using a flat headed mop, the method comprising:
   cleaning a surface with a mop pad coupled to a mop head;
   rotating the mop head into a folded position at a instance with a biasing member coupled to a hinge assembly, the hinge assembly being disposed between the mop head and a mop pole, the hinge assembly having at least one pin offset from a rotation axis for the mop head, the biasing member comprising at least one extension spring coupled between the at least one pin and a top surface of the mop head, the at least one extension spring being disposed opposite the mop pole from the rotation axis;
   inserting the mop head into a first fluid to remove contaminants from the mop pad; and
   inserting the mop head into a wringing assembly to remove at least a portion of the first fluid.

2. The method of claim 1, further comprising inserting the mop head into a second fluid to absorb a second fluid into the mop pad.

3. The method of claim 2, wherein the mop head remains in the same orientation when moving from the first fluid to the wringing assembly to the second fluid.

4. The method of claim 3, wherein the orientation of the mop pad is aligned in a first axis with the mop pole, the first axis extending through the center of the mop pole.

5. The method of claim 3, wherein the mop head remains in the folded position when moving from the first fluid to the wringing assembly to the second fluid.

6. The method of claim 5, further comprising inserting the mop head into the wringing assembly after inserting the mop head into the second fluid.

7. The method of claim 1, further comprising rubbing the mop pad against a cleaning plate when in the first fluid.

8. The method of claim 1, wherein the removing of the at least a portion of the first fluid further includes compressing the mop pad in the wringing assembly.

9. The method of claim 1, further comprising inserting the mop head into the wringing assembly after inserting the mop head into the second fluid.

10. The method of claim 9, wherein the mop head remains in the folded position when moving from the second fluid to the wringing assembly.

11. A method of using a flat headed mop, the method comprising:
cleaning a surface with a mop pad by moving the mop pad over the surface, the mop pad being made from a microfiber material, the mop pad being coupled to a mop head;
rotating the mop head into a folded position at a instance with a biasing member coupled to a hinge assembly, the hinge assembly being disposed between the mop head and a mop pole, the hinge assembly having a pin offset from a rotation axis for the mop head, the biasing member comprising an extension spring coupled between the pin and a top surface of the mop head, the extension spring being disposed opposite the mop pole from the rotation axis, the mop head being substantially parallel to the mop pole when in the folded position;
removing contaminants from the mop pad with a first fluid; and
inserting the mop head into a wringing assembly while in the folded position to remove at least a portion of the first fluid.

12. The method of claim 11, further comprising inserting the mop head into a second fluid to absorb a second fluid into the mop pad.

13. The method of claim 12, wherein the mop head remains in the folded position when moving from the first fluid to the wringing assembly to the second fluid.

14. The method of claim 13, further comprising inserting the mop head into the wringing assembly after inserting the mop head into the second fluid.

15. The method of claim 11, wherein the removing of contaminants includes placing the mop pad in a container with the first fluid.

16. The method of claim 15, further comprising rubbing the mop pad against a cleaning plate when in the container.

17. The method of claim 11, wherein the removing of the at least a portion of the first fluid further includes compressing the mop pad in the wringing assembly.

18. The method of claim 11, further comprising inserting the mop head into the wringing assembly after inserting the mop head into the second fluid.

19. The method of claim 18, wherein the mop head remains in the folded position when moving from the second fluid to the wringing assembly.

20. A method of using a flat headed mop, the method comprising:
cleaning a surface with a mop pad by moving the mop pad over the surface, the mop pad being made from a microfiber material, the mop pad being coupled to a mop head;
rotating the mop head into a folded position at a instance with a biasing member coupled to a hinge assembly, the hinge assembly being disposed between the mop head and a mop pole, the mop head being substantially parallel to the mop pole when in the folded position;
removing contaminants from the mop pad with a first fluid;
inserting the mop head into a wringing assembly while in the folded position to remove at least a portion of the first fluid; and
wherein the biasing member generates a biasing force of 10-80 oz (2.78-22.24 Newtons) when the mop head is positioned perpendicular to the pole.

* * * * *